United States Patent
Hasunuma et al.

(10) Patent No.: US 8,520,531 B2
(45) Date of Patent: Aug. 27, 2013

(54) ISOLATION LIST CREATION PROGRAM, METHOD, AND DEVICE

(75) Inventors: Junichi Hasunuma, Kawasaki (JP);
Hiromi Hayashi, Kawasaki (JP);
Kimihiko Ooe, Sendai (JP); Hitoshi Hazawa, Sendai (JP); Wataru Konno, Sendai (JP)

(73) Assignee: Fujitsu Limited, Kawasaki (JP)

( * ) Notice: Subject to any disclaimer, the term of this patent is extended or adjusted under 35 U.S.C. 154(b) by 976 days.

(21) Appl. No.: 11/744,577

(22) Filed: May 4, 2007

(65) Prior Publication Data

US 2007/0225832 A1    Sep. 27, 2007

Related U.S. Application Data

(63) Continuation of application No. PCT/JP2005/023316, filed on Dec. 20, 2005.

(30) Foreign Application Priority Data

Dec. 21, 2004  (JP) ................. 2004-369140

(51) Int. Cl.
*G01R 31/08* (2006.01)

(52) U.S. Cl.
USPC ........... 370/242; 370/216; 370/221; 370/241; 709/208; 709/211; 709/217; 714/100

(58) Field of Classification Search
USPC ................................................. 709/208–211
See application file for complete search history.

(56) References Cited

U.S. PATENT DOCUMENTS 5,970,437 A * 10/1999 Gorman et al. ............... 702/184

FOREIGN PATENT DOCUMENTS

| JP | 1-207633 | 8/1989 |
|----|----------|--------|
| JP | 6-307992 | 11/1994 |
| JP | 2000-65694 | 3/2000 |
| JP | 2003-202920 | 7/2003 |
| JP | 2004-355361 | 12/2004 |

OTHER PUBLICATIONS

Komatsu et al., "Maintenance and Management System, and Method and Program Therefo" (Machine Translation), Jul. 18, 2003, Japan.*
International Search Report of the International Application No. PCT/JP2005/023316 (mailed Mar. 28, 2006).
Japanese Office Action issued Jun. 22, 2010 in corresponding Japanese Patent Application 2004-369140.

* cited by examiner

*Primary Examiner* — Ian N Moore
*Assistant Examiner* — Jackie Zuniga
(74) *Attorney, Agent, or Firm* — Staas & Halsey LLP

(57) ABSTRACT

An isolation list containing information on a master/slave relation of isolation devices is stored in a history file. A range setting unit sets an isolation range according to a specifying operation with respect to the system diagram of equipment displayed on the screen. A master device registration unit extracts an isolation device present in the set range and registers it as a master device in the isolation list during editing. A slave device search unit successively selects a master device from the isolation list during editing, searches an isolation device which is in a relation of slave device with respect to the selected master device from the history file, and displays a slave device list. A slave device registration unit inserts and places a slave device selected based on the selecting operation of the slave device list after the corresponding master device in the isolation list during editing, thereby completing the list.

9 Claims, 27 Drawing Sheets

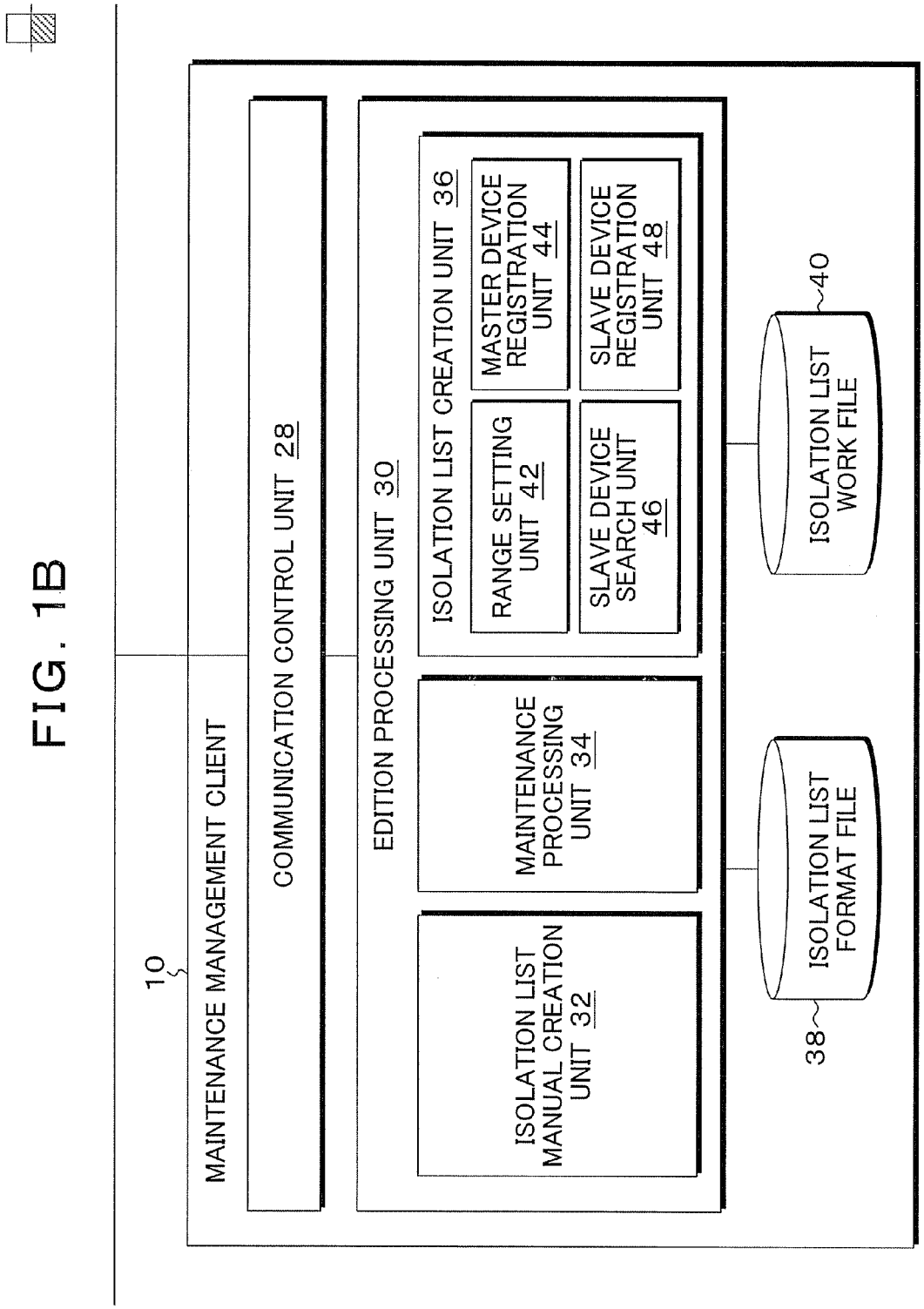

FIG. 5A

PUMP DISMANTLING OPERATION
HEISEI nn th YEAR, m MONTH, mm th DAY TO HEISEI nn th YEAR, n MONTH, nn th DAY

| No. | DEVICE NUMBER | LOCATION | ISOLATION | RECOVERY | MASTER/SLAVE |
|---|---|---|---|---|---|
| 1 | PUMP-020-1 | ON-SITE | OFF | ON | MASTER DEVICE |
| 2 | RMS-020-3 | CONTROL | OFF | ON | SLAVE DEVICE |
| 3 | TRIP-020-1 | ON-SITE | PULL | INSERT | SLAVE DEVICE |
| 4 | AV-020-10 | ON-SITE | CLOSE | OPEN | MASTER DEVICE |
| 5 | SEQ-020-10 | BOARD | CLOSE | OPEN | SLAVE DEVICE |
| 6 | V-020-2 | ON-SITE | CLOSE | OPEN | MASTER DEVICE |
| 7 | V-020-3 | ON-SITE | CLOSE | OPEN | MASTER DEVICE |
| 8 | V-020-1 | ON-SITE | OPEN | CLOSE | MASTER DEVICE |
| 9 | MV-020-100 | ON-SITE | CLOSE | OPEN | MASTER DEVICE |
| 10 | SW-020-1 | BOARD | ON-SITE | CONTROL | SLAVE DEVICE |
| 11 | RMS-020-1 | ON-SITE | CLOSE | OPEN | SLAVE DEVICE |

| REMARKS | ... | RELATED DEVICE | RELATION DELETION |
|---|---|---|---|
| | ......... | PUMP-020-1 | 0 |
| | ......... | PUMP-020-1 | 0 |
| EXCLUDE TEMPERATURE TRIP SIGNAL | ......... | PUMP-020-1 | 0 |
| ON-SITE INDICATION TAG | ......... | AV-020-10 | 0 |
| | ......... | AV-020-10 | 0 |
| | ......... | V-020-2 | 0 |
| | ......... | V-020-3 | 0 |
| | ......... | V-020-1 | 0 |
| ON-SITE INDICATION TAG | ......... | MV-020-100 | 0 |
| | ......... | MV-020-100 | 0 |
| | ......... | MV-020-100 | 0 |
| | | | |

NUCLEAR POWER MAINTENANCE OPERATION MANAGEMENT SYSTEM

DIRECT TAG ISOLATION LIST

<<K13IS020>>

CONSTANT NUMBER: ☐   PERIODICAL INSPECTION ISOLATION NUMBER: ☐   YEAR: 2004 ▶   PLANT NUMBER: 3 ▶

CONTROL NUMBER: 3U-0030   TITLE: PATENT MATERIAL – No.2

MAIN PERSON IN CHARGE: MANAGER   ISOLATION PLANNED PERIOD: 2004 ▶ /07 ▶ /28 ▶ 09 ▶ O'CLOCK~

ISSUING SECTION: POWER GENERATION MANAGEMENT SECTION   APPENDED MATERIAL: NONE   SAFETY ACTION MEMO: NONE

| DELETE | NEW | No. | TAG NUMBER | PLANT NUMBER | DEVICE NUMBER | OPERATION OBJECT |
|---|---|---|---|---|---|---|
| ☐ | | 1 | | 3 ▶ | PUMP-020-1 | DEVICE ▶ |
| ☐ | | 2 | | 3 ▶ | AV-020-10 | DEVICE ▶ |
| ☐ | | 3 | | 3 ▶ | V-020-2 | DEVICE ▶ |
| ☐ | | 4 | | 3 ▶ | V-020-3 | DEVICE ▶ |
| ☐ | | 5 | | 3 ▶ | V-020-1 | DEVICE ▶ |
| ☐ | | 6 | | 3 ▶ | MV-020-100 | DEVICE ▶ |

USER : MANAGER
UPDATE TIME : '04/07/28 11:33

EXAMINATION/
APPROVAL DATE : ☐/☐/☐

STEP NUMBER : 01 ▶  17 ▶ O'CLOCK
2004 ▶ / 07 ▶ / 30 ▶

ISOLATION
REGISTRATION STATE : UNREGISTERED

RELATED Gr/
PERSON IN CHARGE

M1:
M2:
E1:
E2:
OT:

| DEVICE CATEGORY | | DEVICE NAME |
|---|---|---|
| MASTER DEVICE | ▶ | PUMP |
| MASTER DEVICE | ▶ | AIR VALVE |
| MASTER DEVICE | ▶ | MANUAL VALVE 2 |
| MASTER DEVICE | ▶ | MANUAL VALVE 3 |
| MASTER DEVICE | ▶ | MANUAL VALVE 1 |
| MASTER DEVICE | ▶ | ELECTRO-MAGNETIC VALVE |

FIG. 7A 84-1

| No. | DEVICE | LOCATION | ISOLATION | RECOVERY | MASTER/SLAVE | ... | RELATED DEVICE |
|---|---|---|---|---|---|---|---|
| 1 | AV-020-10 | SITE | CLOSE | OPEN | MASTER DEVICE | ...... | AV-020-10 |
| 2 | SEQ-020-10 | BOARD | CLOSE | OPEN | SLAVE DEVICE | ...... | AV-020-10 |
| 3 | V-020-2 | SITE | CLOSE | OPEN | MASTER DEVICE | ...... | V-020-2 |

| REMARKS |
|---|
| ON-SITE INDICATION TAG |
| |
| |

| No. | DEVICE | LOCATION | ISOLATION | RECOVERY | MASTER/SLAVE | ... | RELATED DEVICE |
|---|---|---|---|---|---|---|---|
| 1 | AV-020-10 | SITE | CLOSE | OPEN | MASTER DEVICE | ...... | AV-020-10 |
| 2 | SEQ-020-10 | BOARD | CLOSE | OPEN | SLAVE DEVICE | ...... | AV-020-10 |

| REMARKS |
|---|
| ON-SITE INDICATION TAG |
| |

FIG. 8A

NUCLEAR POWER MAINTENANCE OPERATION MANAGEMENT SYSTEM

DIRECT TAG ISOLATION LIST

<<K13IS021>>

CONSTANT NUMBER: ☐  PERIODICAL INSPECTION ISOLATION NUMBER: ☐  YEAR: ☐ ▶  PLANT NUMBER: ☐ ▶

CONTROL NUMBER: ☐  TITLE: ☐

MAIN PERSON IN CHARGE: ☐  ISOLATION PLANNED PERIOD: ☐▶/☐▶/☐▶ ~ ☐▶ O'CLOCK~

ISSUING SECTION: ☐  APPENDED MATERIAL: ☐  SAFETY ACTION MEMO: ☐

| DELETE | NEW | No. | TAG NUMBER | PLANT NUMBER | DEVICE NUMBER | OPERATION OBJECT |
|--------|-----|-----|------------|--------------|---------------|------------------|
| ☐ | ☐ | 1 | | | | DEVICE ▶ |
| ☐ | ☐ | 2 | 0002 | 3 ▶ | PUMP-020-1 | CENTER CS |
| ☐ | ☐ | 3 | 0003 | 3 | RMS-020-3 | JP/LT |
| ☐ | ☐ | 4 | | 3 | TRIP-020-1 | DEVICE ▶ |
| ☐ | ☐ | 5 | 0005 | 3 ▶ | AV-020-10 | JP/LT |
| ☐ | ☐ | 6 | | 3 | SEQ-020-10 | DEVICE ▶ |
| ☐ | ☐ | 7 | | 3 ▶ | V-020-2 | DEVICE ▶ |
| ☐ | ☐ | 8 | | 3 ▶ | V-020-3 | DEVICE ▶ |
| | | | | 3 ▶ | V-020-1 | |

REFLECT  REFLECT ALL

FIG. 8B

USER : MANAGER
UPDATE TIME : '04/07/28 11:38

EXAMINATION/
APPROVAL DATE : ▢/▢/▢

STEP NUMBER : ▶

▶/▶ ▶ O'CLOCK

ISOLATION
REGISTRATION STATE :

RELATED Gr/
PERSON IN CHARGE

M1:
M2:
E1:
E2:
OT:

– DEVICE NAME

| DEVICE CATEGORY | DEVICE NAME |
|---|---|
| MASTER DEVICE ▶ | PUMP |
| SLAVE DEVICE | REMOTE SWITCH |
| SLAVE DEVICE ▶ | TRIP SIGNAL |
| MASTER DEVICE ▶ | AIR VALVE |
| SLAVE DEVICE | SEQUENCE |
| MASTER DEVICE ▶ | MANUAL VALVE 2 |
| MASTER DEVICE ▶ | MANUAL VALVE 3 |
| MASTER DEVICE ▶ | MANUAL VALVE 1 |

CLOSE

| No. | DEVICE | LOCATION | ISOLATION | RECOVERY | MASTER/SLAVE |
|---|---|---|---|---|---|
| 1 | AV-020-10 | SITE | CLOSE | OPEN | MASTER DEVICE |
| 2 | SEQ-020-10 | BOARD | CLOSE | OPEN | SLAVE DEVICE |
| 3 | V-020-2 | SITE | CLOSE | OPEN | MASTER DEVICE |

| REMARKS | ...... | RELATED DEVICE | RELATION DELETION |
|---|---|---|---|
| ON-SITE INDICATION TAG | ...... | AV-020-10 | 0 |
| | ...... | AV-020-10 | 0→1 |
| | ...... | V-020-2 | 0 |

FIG. 11B 84-2

| No. | DEVICE | LOCATION | ISOLATION | RECOVERY | MASTER/SLAVE |
|---|---|---|---|---|---|
| 1 | AV-020-10 | SITE | CLOSE | OPEN | MASTER DEVICE |
| 2 | SEQ-020-11 | BOARD | CLOSE | OPEN | SLAVE DEVICE |
| 3 | V-020-2 | SITE | CLOSE | OPEN | MASTER DEVICE |

| REMARKS | ...... | RELATED DEVICE |
|---|---|---|
| ON-SITE INDICATION TAG | ...... | AV-020-10 |
| | ...... | AV-020-10 |
| | ...... | V-020-2 |

FIG. 11C 84-3

| No. | DEVICE | LOCATION | ISOLATION | RECOVERY | MASTER/SLAVE |
|---|---|---|---|---|---|
| 1 | AV-020-10 | SITE | CLOSE | OPEN | MASTER DEVICE |
| 2 | SEQ-020-11 | BOARD | CLOSE | OPEN | SLAVE DEVICE |
| 3 | SEQ-020-12 | BOARD | CLOSE | OPEN | SLAVE DEVICE |

| REMARKS | ...... | RELATED DEVICE |
|---|---|---|
| | ...... | AV-020-10 |
| ON-SITE INDICATION TAG | ...... | AV-020-10 |
| | ...... | AV-020-10 |

FIG. 11D 84-4

| No. | DEVICE | LOCATION | ISOLATION | RECOVERY | MASTER/SLAVE |
|---|---|---|---|---|---|
| 1 | AV-020-10 | SITE | CLOSE | OPEN | MASTER DEVICE |
| 2 | SEQ-020-11 | BOARD | CLOSE | OPEN | SLAVE DEVICE |
| 3 | SEQ-020-12 | BOARD | CLOSE | OPEN | SLAVE DEVICE |

| REMARKS | ...... | RELATED DEVICE |
|---|---|---|
| ON-SITE INDICATION TAG | ...... | AV-020-10 |
| | ...... | AV-020-10 |
| | ...... | AV-020-10 |

FIG. 12

NUCLEAR POWER MAINTENANCE OPERATION MANAGEMENT SYSTEM

ISOLATION DEVICE STATE SETTING

USER : MANAGER
UPDATE TIME : '04/07/28 10:50

<<K13MS031>>

| UNNECESSARY DEVICE | COMPLEMENT LOCK | RELATION DELETION | DEVICE NUMBER | OPERATION OBJECT | DEVICE CATEGORY | DEVICE NAME |
|---|---|---|---|---|---|---|
| ☐ | ☐ | ☐ | AV-020-10 | DEVICE | MASTER DEVICE | AIR VALVE |
| ☐ | ☐ | ☐ | SEQ-020-10 | JP/LT | SLAVE DEVICE | SEQUENCE |

90
92

REGISTER

RETURN

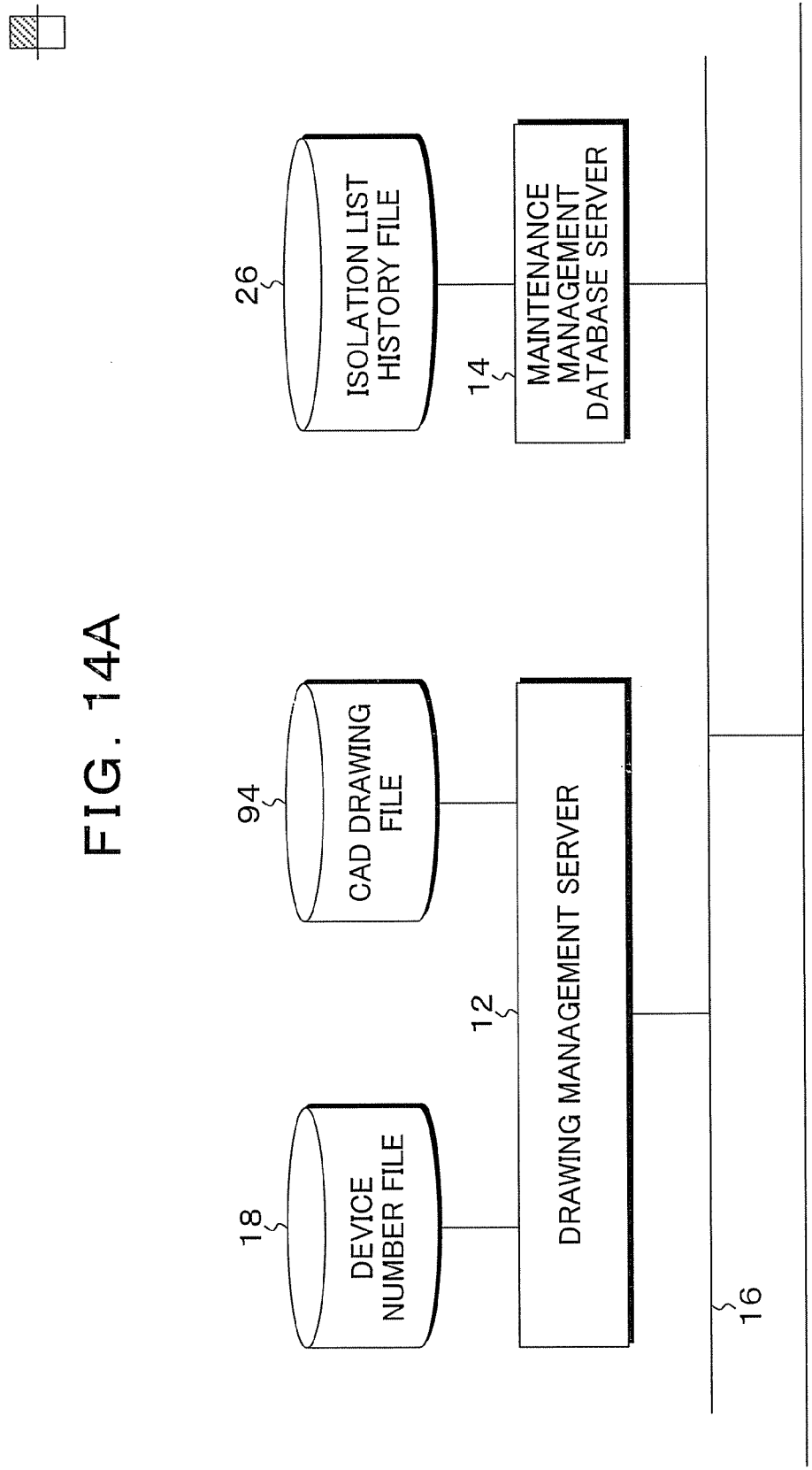

FIG. 18
PRIOR ART

| PUMP DISMANTLING OPERATION HEISEI nn th YEAR, m MONTH, mm th DAY TO HEISEI nn th YEAR, n MONTH, nn th DAY | | | | | |
|---|---|---|---|---|---|
| No. | DEVICE | INSTALLATION SITE | ISOLATION | RECOVERY | REMARKS |
| 1 | VALVE 1 | ROOM A | CLOSE | OPEN | |
| 2 | VALVE 2 | ROOM A | CLOSE | OPEN | |
| 3 | VALVE 3 | ROOM A | OPEN | CLOSE | CAUTION UPON DRAINING SINCE TEMPERATURE IN FLUID IS HIGH |
| | | | ⋮ | ⋮ | |

ISOLATION LIST CREATION PROGRAM, METHOD, AND DEVICE

This application is a continuation of PCT/JP2005/023316, filed Dec. 20, 2004.

This application is a priority based on prior application No. JP 2004-369140 filed Dec. 21, 2004, in Japan.

TECHNICAL FIELD

The present invention relates to isolation list creation program, method, and device which create an isolation list required in maintenance/check operations of plant devices with computer aid and, particularly relates to isolation list creation program, method, and device which create an isolation list efficiently and safely.

BACKGROUND ART

Conventionally, in a large scale plant such as a nuclear power plant, isolation operations which are system isolation operations in which fluids flowing in piping are blocked for a maintenance operation of the plant has been performed. An outline of the isolation operation is as the following.

FIG. 17 is an example showing, on a screen, a part of plant equipment which is an object of the isolation operation, wherein, during a normal operation, a fluid such as a liquid/gas flows in the direction of an arrow 200 in the drawing through a pump 202. Upon check of the pump 202, isolation operations of closing valves 204 and 206 and opening a valve 208 are performed, thereby blocking and discharging the fluid and performing disassembling check or the like of the pump 202.

Upon check that is accompanied by such isolation operations, the following operations are performed in consideration of safety.

(1) An isolation list is created, and whether they are to be differently operated or not in another operation is checked.
(2) Isolation tags with which operation prohibition can be confirmed on site are printed.

A simple example of the isolation list created for the isolation operations of FIG. 17 is shown in FIG. 18. In the isolation list, "PUMP DISMANTLING OPERATION" is described as an operation article, and "HEISEI nn th YEAR, m MONTH, mm th DAY TO HEISEI nn th YEAR, n MONTH, nn th DAY" is described as an operation period; and device names, installation locations, isolation operation details (isolation), recovery operation details (recovery), etc. are described for the isolation devices required for the pump dismantling.

Conventionally, the isolation list has been created by manual operations, and it is created in accordance with the following procedure.

(1) A system diagram is traced by a marker to determine an isolation range (system isolation range).
(2) A list of devices in the isolation range is created.
(3) A diagram of the power supply system of the devices, for example, a single line connection diagram is referenced to create a list of switches and the like.
(4) A diagram of interlocks of the devices, for example, a sequence diagram is referenced to create a list of jumpers and the like. Note that the jumpers and the like of the list are for, for example, interlocking by bypassing wiring terminals of switches within a board by clips in order to avoid activation stop of the devices caused by remote operation switches provided on a control board.

As described above, conventional creation of an isolation list by manual operations is an extremely difficult task which is performed while referencing a great number of documents. Therefore, in terms of ensuring efficient creation of an isolation list and safety, the inventors of the present application have proposed a system, a method, and a program which efficiently create an isolation list by means of computer aid (Patent Document 1).

The creation method of the isolation list is performed in the following procedure.

(1) A list is created by copying a past isolation list.
(2) An isolation list is created from CAD diagrams (system diagrams, single line connection diagrams, sequence diagrams).

Such computer-aided creation method of an isolation list is on the assumption that all the devices of plant equipment serving as objects are categorized in the format of "device model-system-device", and the isolation objective devices are further on the assumption that each of them is expressed as "device+operation object".

Therefore, when devices on system diagrams are selected based on the devices categorized in the format of "device model-system-device", an isolation list can be automatically created by "device number+operation object" registered with CAD symbols.

Patent Document 1: Japanese Patent Application Laid-Open (kokai) No. 2003-202920

DISCLOSURE OF INVENTION

However, in general nuclear reactor plants and plants of other industries, in many cases, the precondition that all the devices of plant equipment are categorized in the format of "device model-system-device" cannot be applied, the computer aid function cannot be utilized since the preconditions are different, and isolation list creation close to manual operations is required.

As a matter of course, when master data in which all devices are categorized in the format of "device model-system-device" is registered in a system for plant equipment serving as an object, automatic generation of an isolation list by means of computer aid can be performed; however, for example, in a nuclear reactor plant, the number of devices reaches up to several tens of thousands, and the number of operation objects such as switches and jumpers for operating the devices reaches up to several hundreds of thousands due to the complexity of the plant. Therefore, registering master data in a system and performing maintenance can be said to be an extremely difficult operation.

It is an object of the present invention to provide isolation list creation program, method, and system for computer aid with which an isolation list can be efficiently created, even in a facility having drawing data not containing relation information showing interrelation of devices such as systems, by providing and saving relation information upon isolation list creation by means of a manual operation in an initial stage and utilizing the relation information of the devices of the created isolation list.

Means for Solving the Problems

The present invention provides a program which is executed by a computer for creating an isolation list.

The program of the present invention is characterized by causing a computer to execute a saving step of saving an isolation list, to which information of master/slave relation of isolation devices is added, in a history file;

a range setting step of setting an isolation range based on a specifying operation with respect to a system diagram of equipment displayed on a screen;

a master device registration step of extracting the isolation device present in the set range and registering the device as a master device in an isolation list, which is during editing;

a slave device search step of sequentially selecting the master device from the isolation list, which is during editing, searching the isolation device which is in the relation of slave device with respect to the selected master device from the history file, and displaying a slave device list; and a slave device registration step of inserting and placing the slave device selected based on a selecting operation of the slave device list after the corresponding master device of the isolation list, which is during editing, so as to complete the list.

Herein, in the saving step, an isolation list created by a manual operation in an initial stage is saved in the history file. The slave devices of the isolation list include devices such as switches and the like extracted from a single line connection diagram of a power supply system and the like related to the master device and jumpers and the like extracted from a sequence diagram. The isolation list includes, as display articles, device numbers, device category information indicating whether the device is the master device or the slave device, and related device information indicating master/slave relation.

The isolation list further has relation deletion information which cancels setting of the slave device as a display article, and effectively sets the relation deletion information in accordance with needs by a maintenance process so as to cancel master/slave relation without changing the list contents.

In the range setting step, a CAD drawing is displayed as the system diagram, and the isolation range is automatically set based on a specifying operation of a maintenance object device in the CAD drawing; and, in the slave device search step, with respect to a specifying operation of the master device on the CAD drawing, the isolation device which is related to the specified master device as the slave device is searched from the history file, and a slave device list is displayed in a window.

The present invention provides an isolation list creation method by means of computer aid. The isolation list creation method of the present invention is characterized by including a saving step of saving an isolation list, to which information of master/slave relation of isolation devices is added, in a history file;

a range setting step of setting an isolation range based on a specifying operation with respect to a system diagram of equipment displayed on a screen;

a master device registration step of extracting the isolation device present in the set range and registering the device as a master device in an isolation list, which is during editing;

a slave device search step of sequentially selecting the master device from the isolation list, which is during editing, searching the isolation device which is in the relation of slave device with respect to the selected master device from the history file, and displaying a slave device list; and a slave device registration step of inserting and placing the slave device selected based on a selecting operation of the slave device list after the corresponding master device of the isolation list, which is during editing, so as to complete the list.

The present invention provides an isolation list creation device by means of computer aid. The isolation list creation device of the present invention is characterized by including a history saving unit which saves an isolation list, to which information of master/slave relation of isolation devices is added, in a history file;

a range setting unit which sets an isolation range based on a specifying operation with respect to a system diagram of equipment displayed on a screen;

a master device registration unit which extracts the isolation device present in the set range and registers the device as a master device in an isolation list, which is during editing;

a slave device search unit which sequentially selects the master device from the isolation list, which is during editing, searches the isolation device which is in the relation of slave device with respect to the selected master device from the history file, and displays a slave device list; and a slave device registration unit which inserts and places the slave device selected based on a selecting operation of the slave device list after the corresponding master device of the isolation list, which is during editing, so as to complete the list.

Note that details of the isolation creation method and device of the present invention are basically same as the case of the program of the present invention.

Effects of the Invention

According to the present invention, firstly, maintenance of maser data of isolation devices which reach up to several hundreds of thousands can be performed. More specifically, since the present invention utilizes isolation lists which are created in the past as virtual master data, maintenance of isolation device master along with change of devices, which is required in a normal system, becomes unnecessary. In the case of a nuclear reactor plant, the isolation devices reach up to several hundred thousands; and, when the master is to be subjected to maintenance, an enormous amount of cost is taken; however, the maintenance cost can be drastically reduced. More specifically, in the case of the nuclear reactor plant, the master data is prepared through several times of periodical check in which the isolation lists are created.

Secondly, according to the present invention, an isolation list can be created without referencing many drawings. When an isolation list is to be created, many drawings such as system diagrams, sequence diagrams, and single line connection diagrams are referenced, a highlight pen is fully made use of to create the isolation list in the state close to manual operations, and this labor is enormous. On the other hand, according to the present invention, already-created isolation lists, which are past know-how and results, are automatically searched from the information of the master devices in an isolation range of a system diagram and displayed; as a result, up to setting of switches, jumpers, and the like can be determined, and efficiency and safety of isolation list creation operations can be improved.

Thirdly, according to the present invention, the cost taken for maintenance of drawings can be reduced. In order to determine the devices in master/slave relation which are not related by, for example, device numbers on CAD drawings, the information thereof has to be embedded in the CAD drawings. However, since the embedded information is not displayed (visualized) on the CAD drawings, upon maintenance of the drawings, change operations are often forgotten. If the drawing maintenance is defective, the system does not normally operate.

Therefore, in the present invention, the master/slave relation of the devices is externally managed with respect to the CAD drawings, and it is not required to be managed as parameters on the CAD drawings; therefore, maintenance is simple and easy, and the operation cost taken for the maintenance can be reduced.

Fourth, according to the present invention, the special data environment in which all the devices have to be categorized by the format of "device model-system-device" is not required, an isolation list can be created by means of computer aid without changing the information serving as keys such as device numbers of the plants which are currently being operated, and flexible applications to various plant maintenance operations can be made not only for a nuclear power generation plant.

BRIEF DESCRIPTION OF THE DRAWINGS

FIGS. 1A and 1B are block diagrams of a functional configuration of an isolation list creation device according to the present invention;

FIGS. 5A and 5B are explanatory diagrams of an isolation list according to the present invention which is generated for the isolation range of FIG. 4;

FIGS. 6A and 6B are explanatory diagrams of an editing screen in which the isolation devices of FIGS. 5A and 5B are registered as master devices;

FIGS. 7A and 7B are explanatory diagrams of an isolation list and a slave device search list searched by specifying a master device of the editing screen of FIGS. 6A and 6B;

FIGS. 8A and 8B are explanatory diagrams of an editing screen in which slave devices are specified and registered;

FIGS. 11A to 11D are explanatory diagrams of a plurality of isolation lists to be subjected to maintenance and a slave device search list;

FIG. 12 is an explanatory diagram of a device state setting screen which is displayed when slave relation is to be cancelled by the maintenance processing unit of FIGS. 1A and 1B;

FIGS. 14A and 14B are block diagrams showing another embodiment of the present invention using a CAD drawing as a system diagram;

FIG. 18 is an explanatory diagram of a conventional isolation list created for FIG. 17.

BEST MODE FOR CARRYING OUT THE INVENTION

Figure 1A:
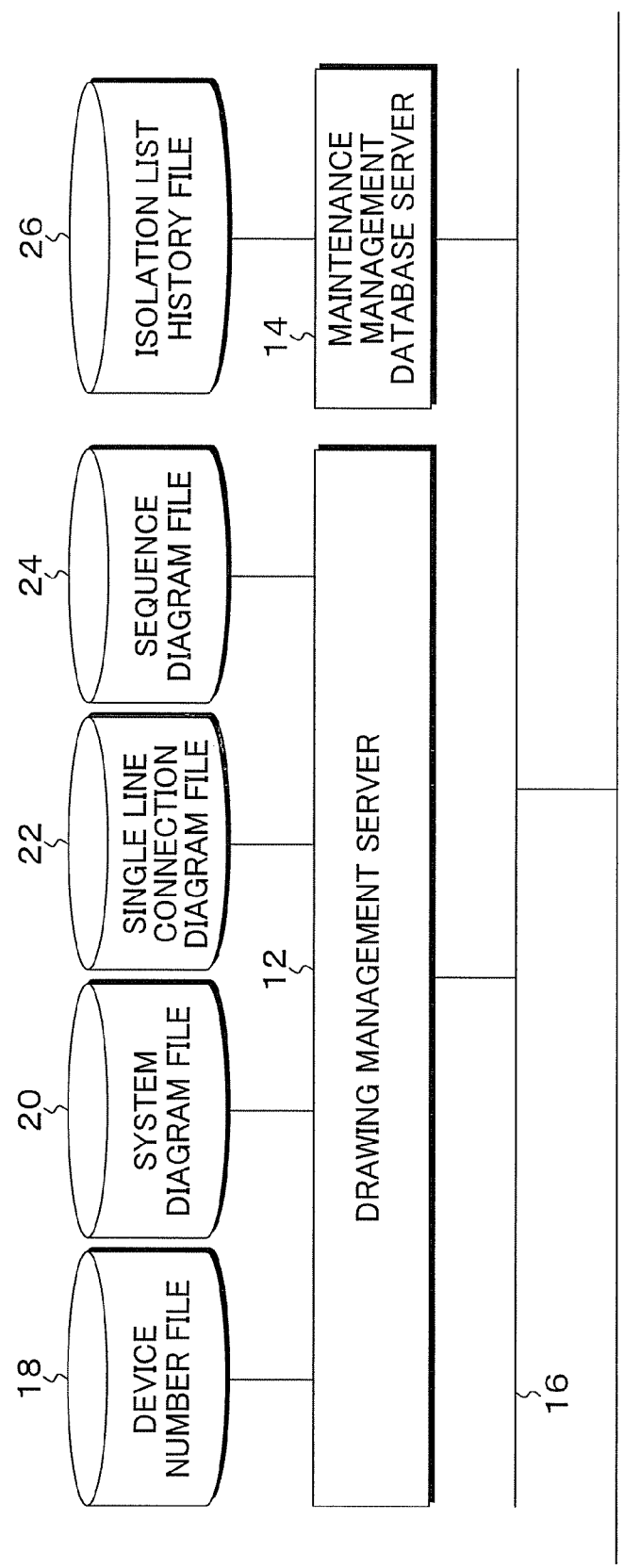

FIGS. 1A and 1B are block diagrams of a functional configuration of an isolation list creation device according to the present invention. In FIGS. 1A and 1B, the isolation list creation device of the present invention is installed in a maintenance management system which is provided for a plant such as a nuclear power plant; and, as a system configuration, with respect to a maintenance management client 10 which functions as the isolation list creation device of the present invention, a drawing management server 12 and a maintenance management database server 14 are connected via a network 16 such as a LAN.

To the drawing management server 12, drawing files such as a device number file 18, a system diagram file 20, a single line connection diagram file 22, and a sequence diagram file 24 are connected.

Also, to the maintenance management database server 14, an isolation list history file 26 is connected, wherein isolation lists created by manual operations and the maintenance management client 10 of the present invention in the past are saved as history information.

In the maintenance management client 10 which functions as the isolation list creation device of the present invention, a communication control unit 28 and an edition processing unit 30 are provided.

In the edition processing unit 30, an isolation manual creation unit 32, a maintenance processing unit 34, and an isolation list creation unit 36 are provided. In addition, with respect to the edition processing unit 30, an isolation list format file 38 and an isolation list work file 40 are connected.

The isolation list manual creation unit 32 performs a computer aid process when an isolation list is to be created by a manual operation like a conventional operation. In isolation list creation by the isolation list manual creation unit 32, upon an isolation operation for isolating particular devices in repair check or periodical check with respect to failure of plant devices in an initial stage wherein the isolation list creation device of the present invention is introduced, an isolation list is created by a manual operation under computer aid by the function of the isolation list manual creation device 32.

Isolation lists created by the manual operations under computer aid by the isolation list manual creation unit 32 are saved in the isolation list history file 26 of the maintenance management database server 14.

When the contents of isolation lists created in the past and saved in the isolation list history file 26 are to be changed upon list creation along with isolation operations thereafter, the maintenance processing unit 34 executes maintenance processes of the list contents so as to maintain latest isolation list contents.

The isolation list creation unit 36 is a part that realizes functions according to the present invention and has the functions of a range setting unit 42, a master device registration unit 44, a slave device search unit 46, and a slave device registration unit 48.

The range setting unit 42 sets an isolation range based on a specifying operation of an operator with respect to a system diagram of equipment acquired from the system diagram file 20, which is managed by the drawing management server 12, and displayed on a screen. The setting of the isolation range with respect to the system diagram on the display screen is specified, for example, by surrounding a range including isolation devices by lines, for example by a mouse cursor, on the system diagram displayed on the screen.

The master device registration unit 44 extracts the isolation devices which are present in the isolation set range set by the range setting unit 42 and register them as master devices in an isolation list which is during editing.

The slave device search unit 46 sequentially selects master devices from the isolation list, which is during editing, searches the isolation devices which are related to the selected master devices as slave devices from the isolation lists of the isolation list history file 26 which are managed by the maintenance management database server 14 and created in the past, and displays a slave device list.

The slave device registration unit 48 completes the list by inserting and placing the slave devices selected from the slave devices, which are listed in the slave device list displayed by the slave device search unit 46, based on selecting operations of the operator after the corresponding master device in the isolation list, which is during editing.

Figure 2:
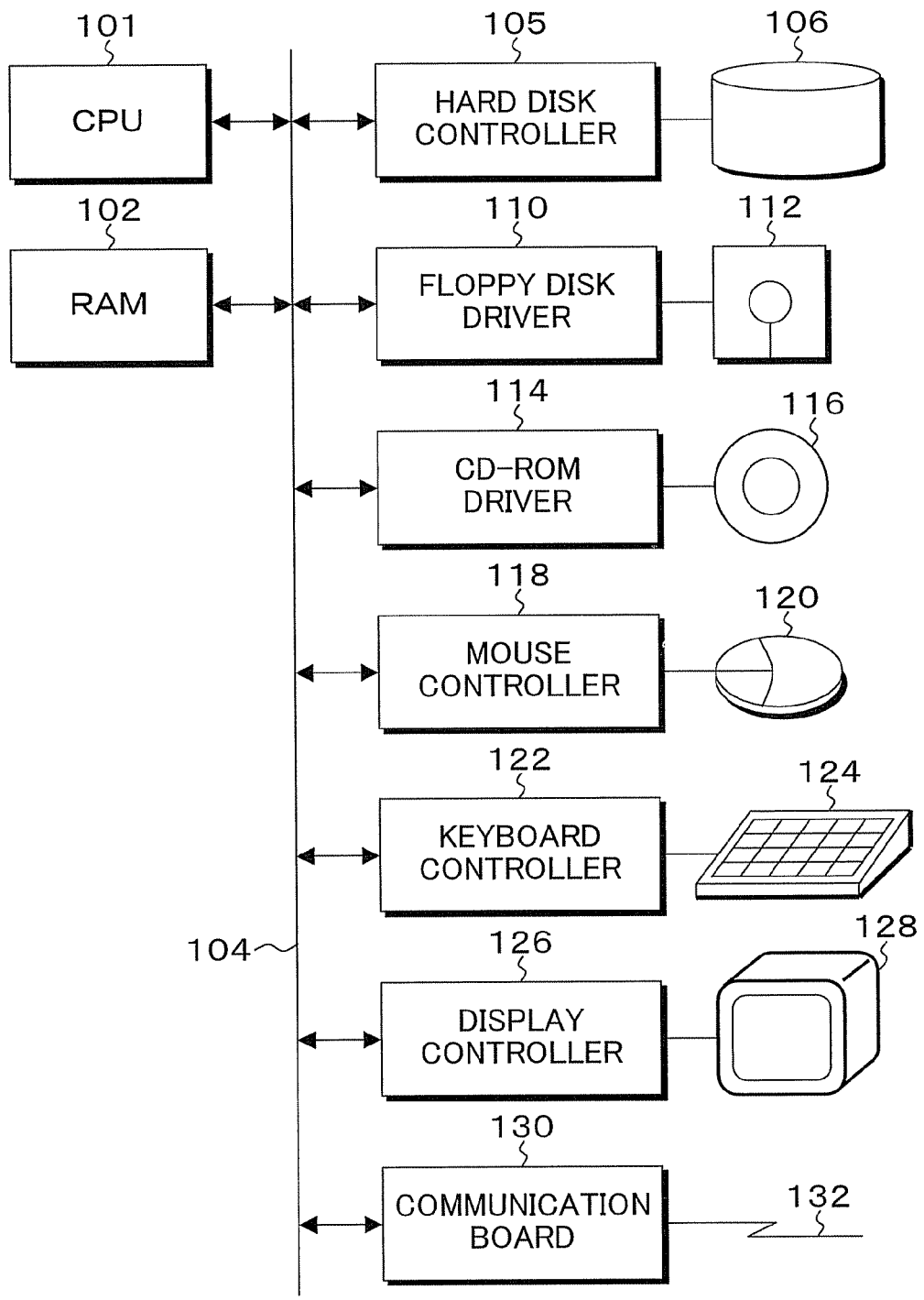
FIG. 2 is an explanatory diagram of a hardware environment of a computer which realizes the maintenance management client of FIGS. 1A and 1B.

The maintenance management client 10 in FIGS. 1A and 1B is realized by hardware resources of a computer such as that in FIG. 2. In the computer of FIG. 2, to a bus 104 of a CPU 101, a RAM 102, a hard disk controller (software) 105, a floppy disk driver (software) 110, a CD-ROM driver (software) 114, a mouse controller 118, a keyboard controller 122, a display controller 126, and a communication board 130 are connected.

The hard disk controller 105 is connected to a hard disk driver 106, wherein an isolation list creation program of the present invention is loaded, invokes a necessary program from the hard disk drive 106 upon start-up of the computer, deploys it on the RAM 102, and executes it by the CPU 101.

A floppy disk drive (hardware) 112 is connected to the floppy disk driver 110, and read/write with respect to a floppy disk (R) can be performed. A CD driver (hardware) 116 is connected to the CD-ROM driver 114, and data or programs stored in a CD can be read.

The mouse controller 118 transmits input operations of a mouse 120 to the CPU 101. The keyboard controller 122 transmits input operations of a keyboard 124 to the CPU 101. The display controller 126 performs display with respect to a display unit 128. The communication board 130 uses a communication line 132 including wireless transmission and performs communication with devices within a network via a LAN.

Figure 3:
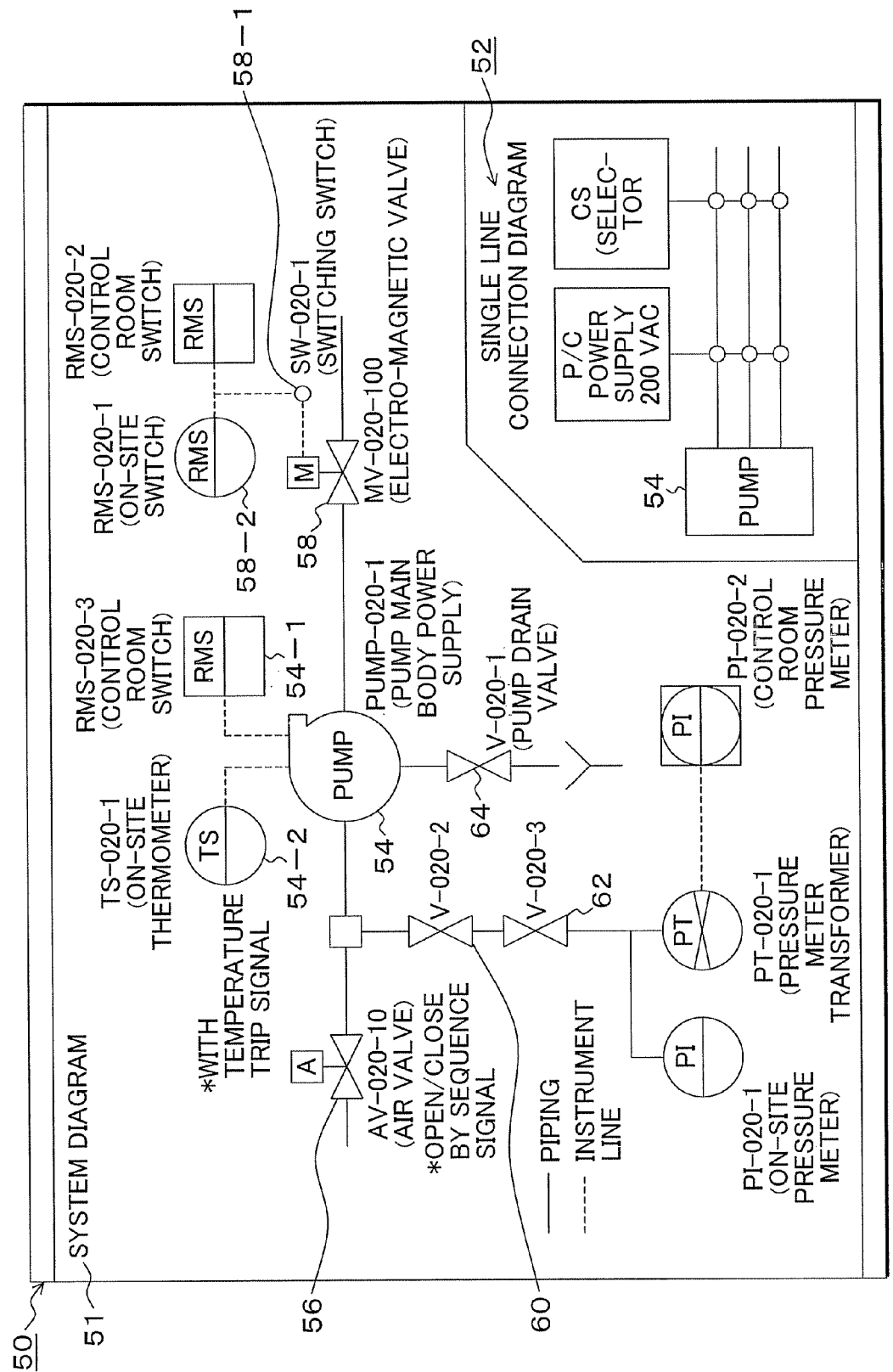
FIG. 3 is an explanatory diagram of a drawing display screen displayed upon isolation list creation according to the present invention.

FIG. 3 is an explanatory diagram of a drawing display screen which is displayed upon isolation list creation according to the present invention.

In the drawing display screen 50 of FIG. 3, a system diagram 51 is entirely displayed, and a single line connection diagram 52 is shown at the lower right corner. The system diagram 51 shows a part of the system diagram 51 that is for isolation operations required for a dismantling operation of a pump 54, and the single line connection diagram 52 shows a power supply system with respect to the pump 54.

In the system diagram 51, in piping around the pump 54, an air valve 56, an electro-magnetic valve 58, manual valves 60 and 62, and a pump drain valve 64 are disposed; and operation of the pump 54 has to be stopped, and these valves have to be operated for an isolation operation for a dismantling operation.

For the pump 54, a control room switch 54-1 and an on-site thermometer 54-2 are provided as maintenance object devices having link relation.

Also, for the electro-magnetic valve 58, a switching switch 58-1 and an on-site switch 58-2 are provided as maintenance object devices having link relation. Also for the air valve 56, a control board switch, which is not shown, is provided as a maintenance object device having link relation.

Figure 4:
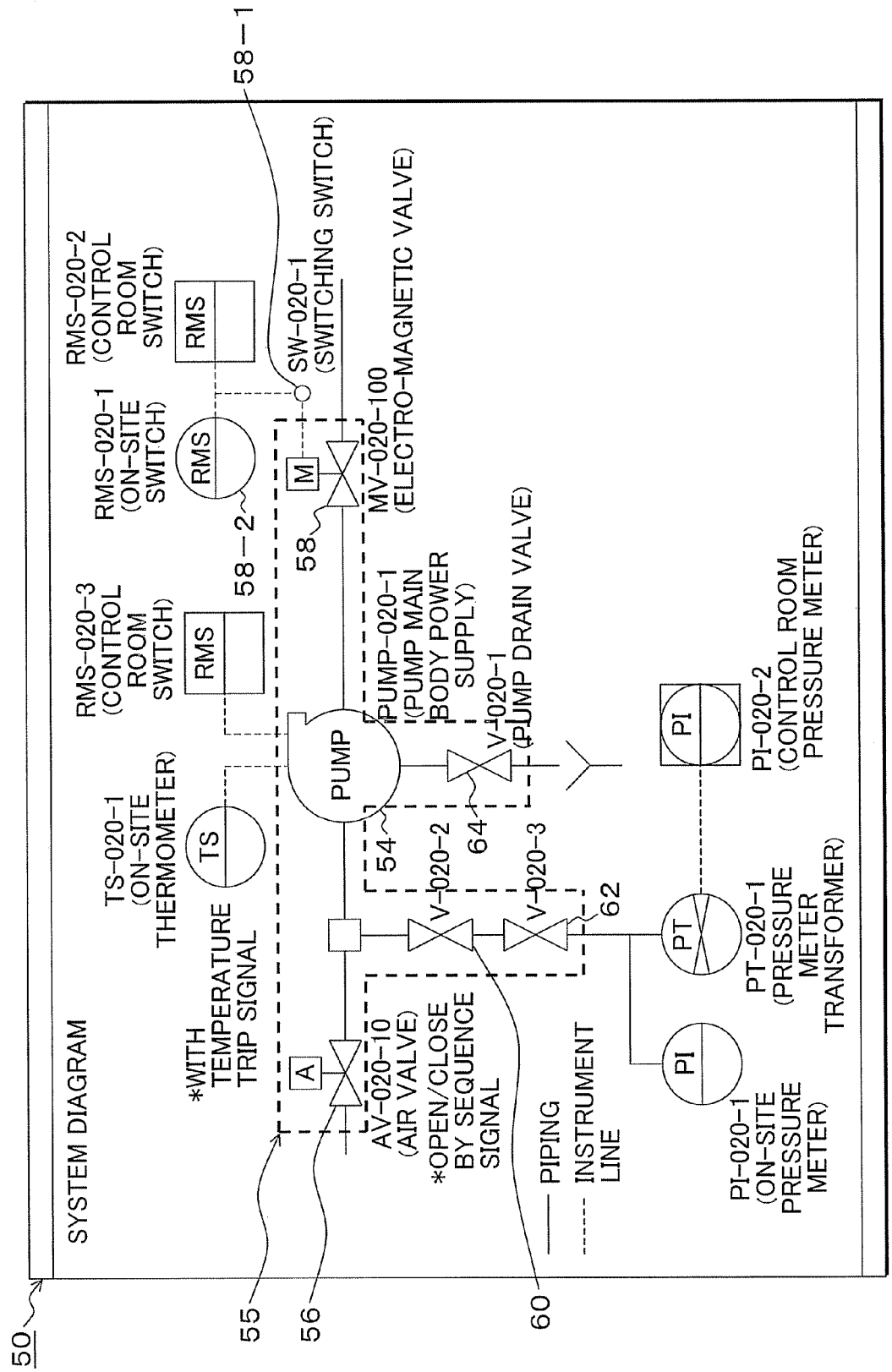
FIG. 4 is an explanatory diagram of a drawing display screen in which an isolation range is set.

FIG. 4 is an explanatory diagram of a drawing display screen in which an isolation range is set with respect to the system diagram 51 of the drawing display screen of FIG. 3. In FIG. 4, as the isolation range 55, when the pump 54 which is to be subjected to a dismantling operation is specified, a range including the air valve 56, the electro-magnetic valve 58, the manual valves 60 and 62, and the pump drain valve 64 is set as a range of the devices to be subjected to isolation operations.

Figure 5B:

FIGS. 5A and 5B are explanatory diagrams of an isolation list according to the present invention created for the isolation range 55 of FIG. 4. In FIGS. 5A and 5B, in the isolation list 65 of the present invention, as an operation article 66, the name of "PUMP DISMANTLING OPERATION" and an operation period "HEISEI nn th YEAR, m MONTH, mm th DAY TO HEISEI nn th YEAR, n MONTH, nn th DAY" are displayed, and, subsequent to that, a list of No. 1 to No. 11 is shown for isolation devices.

As display articles in the list of the isolation devices, locations 70 such as a site, a control room, and an operation board, isolation operation details 72 of the devices, recovery 74 which is operation details upon recovery of the devices, master/slave 76 indicating whether it is a master device or a slave device, related devices 78 serving as related device information indicating master/slave relation of the devices, and relation deletion flags 80 serving as relation deletion information are provided.

A main characteristic in such isolation list 65 of the present invention is that, for the isolation devices specified by the device numbers 68, link relation with master devices is newly set by the related devices 78 for the slave devices set by the master/slave 76. Corresponding to the master device or slave device according to the master/slave 76, as the related device 78, the device number of the master device per se is registered if it is a master device, and the device number of a master device that is in link relation is registered if it is a slave device.

For example, the electro-magnetic valve 58 shown in the isolation range 55 of FIG. 4 is taken as an example, the switching switch 58-1 and the on-site switch 58-2 are connected to the electro-magnetic valve 58 as maintenance object devices which are in link relation, and this point is registered to be shown in Nos. 9 to 11 in the isolation list 65 of FIGS. 5A and 5B.

No. 9 is the electro-magnetic valve 58, wherein "MV-020-100" is described as the device number 68, "master device" is registered as the master/slave 76, and the device number of the device per se is registered as the related device 78.

Regarding the switching switch 58-1 of next No. 10, "SW-020-1" is described as the device number 68, "SLAVE DEVICE" is described as the master/slave 76 since it is in link relation with respect to the electro-magnetic valve 58 which is a master device, and the device number "MV-020-100" of the electro-magnetic valve 58 which is the master device having the link relation is registered as the related device 78 in this case.

Furthermore, in No. 11, the device number "RMS-020-1" of the on-site switch 58-2 which is in link relation with respect to the electro-magnetic valve 58 is registered, "SLAVE DEVICE" is registered as the master/slave 76 since it is in slave relation wherein the electro-magnetic valve 58 serves as a master device, and the device number "MV-020-100" of the electro-magnetic valve 58 which is the master device having the link relation is registered as the related device 78.

This point is also similar in registration of the control room switch 54-1 as a slave device and a temperature trip provided at the on-site thermometer 54-2 as a slave device with respect to the pump 54 which is the master device of Nos. 1 to 3, and also similar for those shown in Nos. 4 and 5 wherein the air valve 56 serves as a master device and a control board sequence switch which is not shown and serves as a slave device thereof.

Note that, the manual valves 60 and 62 and the pump drain valve 64 of Nos. 6 to 8 are not in slave relation with other isolation devices, and each of them is independently present as a master device.

Regarding the isolation list 65 shown in FIGS. 5A and 5B, in the system of FIGS. 1A and 1B, whether isolation lists created in the past are saved in the isolation list history file 26 is checked, or, in an initial stage in which there are not many of them, an operator creates an isolation list 65 such as that shown in FIGS. 5A and 5B by manual operations by selecting, for example, the devices present in the isolation range 55 of FIG. 4 as master devices and selecting the maintenance object devices which are in link relation with respective master devices from the single line connection diagrams and the sequence diagrams and registering them as slave devices under computer aid by the isolation list manual creation unit 32 provided in the edition processing unit 30 of the maintenance management client 10 while seeing the system diagram 51, the single line connection diagram 52, and the sequence diagram on the drawing display screen 50 as shown in FIG. 3.

Meanwhile, in the system of FIGS. 1A and 1B, when a sufficient amount of past isolation lists enough for starting operation by the system having the maintenance management client 10 are saved in the isolation list history file 26, the isolation list creation unit 36 provided in the edition processing unit 30 of FIGS. 1A and 1B works, utilizes the isolation lists created in the past and saved in the isolation list history file 26, and automatically creates and displays a slave device search list based on specification of a master device present in the isolation range; and, when the operator selects and specifies necessary slave devices from the slave device search list, list creation in which the slave devices are automatically inserted and placed with respect to the master device can be performed.

For example, in the case of a nuclear reactor plant, the isolation list history file 26 in which past isolation lists necessary for a creation process by the isolation list creation unit 36 according to the present invention are saved is prepared through several times of periodical check.

Herein, as drawing files in the diagram management server 12 of FIGS. 1A and 1B, for example in the case of a nuclear reactor plant, there are about 300 system diagrams of the system diagram file 20 per one reactor; and, in accordance with this, the number of drawings of the single line connection diagram file 22 is about several hundreds.

Furthermore, the number of sequence diagrams of the sequence diagram file 24 is about ten thousand.

Therefore, in creation of an isolation list performed by manual operations under computer aid by the isolation list manual creation unit 32 of the edition processing unit 30, an isolation range is determined in a system diagram, a list of switches and the like is generated for the isolation devices in the isolation range by referencing single line connection diagrams, and a list of jumpers and the like is generated by referencing the single line connection diagrams; thus, it is an extremely difficult operation.

However, at the point when several times of check is finished for such difficult isolation list creation operation by manual operations, setting of slave devices utilizing the past isolation list history file 26 by the isolation list creation unit 36 according to the present invention is enabled.

As described above, since setting of the slave devices which are in master/slave relation with the isolation devices can be readily performed by utilizing the past isolation lists, creation of the list of switches and the like from several hundreds of single line connection diagrams and creation of the list of jumps and the like from the sequence diagrams, which reaches up to ten thousand, required in conventional manual operations become unnecessary, and operation load in the isolation list creation operation can be significantly reduced.

FIGS. 6A and 6B are explanatory diagrams of a specific editing screen in which the isolation devices in the isolation range 55 of FIGS. 5A and 5B are registered as master devices. In the editing screen 82 of FIGS. 6A and 6B, a format list 84 generated from the isolation list format file 38 of FIGS. 1A and 1B is displayed, the device numbers of the isolation devices extracted from the isolation range 55 of FIG. 4 are input as the device numbers in the format list 84, and all registration of the master devices is performed by opening and selecting dialogues provided for "DEVICE TYPE CATEGORY" indicating the master/slave relation shown as display articles.

Such editing screen in which the master devices are registered in the format list 84 serves as a basic editing screen which forms the framework of an isolation list. Next, the master devices registered in the format list 84 of the editing screen 82 of FIGS. 6A and 6B are specified one by one to display a slave device search list.

For example, when the device number "RMS-020-10" of the air valve 56 of No. 2 in the format list 84 of FIGS. 6A and 6B is specified to request a slave device search list, search is requested to the maintenance management database server 14 of FIGS. 1A and 1B, and an isolation list including the slave devices which are in slave relation with respect to the master device "AV-020-10" is searched, for example like FIG. 7A, from the past isolation lists saved in the isolation list history file 26.

The isolation list 84-1 of FIG. 7A focuses on a part of the isolation list including a slave device set for the device number "AV-020-10" of the air valve 50 which is the master device, and the slave device has a device number "SEQ-020-10" which is a control board switch.

When such isolation list 84-1 is searched, a slave device search list 86 shown in FIG. 7B is acquired. The slave device search list 86 is displayed as a window or articles when the format list 84 is scrolled; and, since checkboxes (not shown) are provided for No. 1 and No. 2 in the slave device search list 86, when the operator selects a necessary slave device by the checkbox, the specified slave device is automatically inserted and placed after the master device in the format list 84 of FIGS. 6A and 6B.

An editing screen 88 of FIGS. 8A and 8B is an example of the isolation list in which slave devices are inserted and placed subsequent to master devices by specifying the slave devices based on the slave device search list 86 such as that of FIG. 7B; and, in this example, after the device number "AV-020-10" which is the air valve of No. 4, the device number "SEQ-020-10" of the control board switch is inserted and placed as a slave device based on the fact that it is selected as a slave device.

In the above described manner, a slave device search list is obtained for every master device by referencing past isolation lists, and when necessary slave devices are specified therefrom, an isolation list in which the slave devices are disposed subsequent to the master device is completed.

Figure 9A:
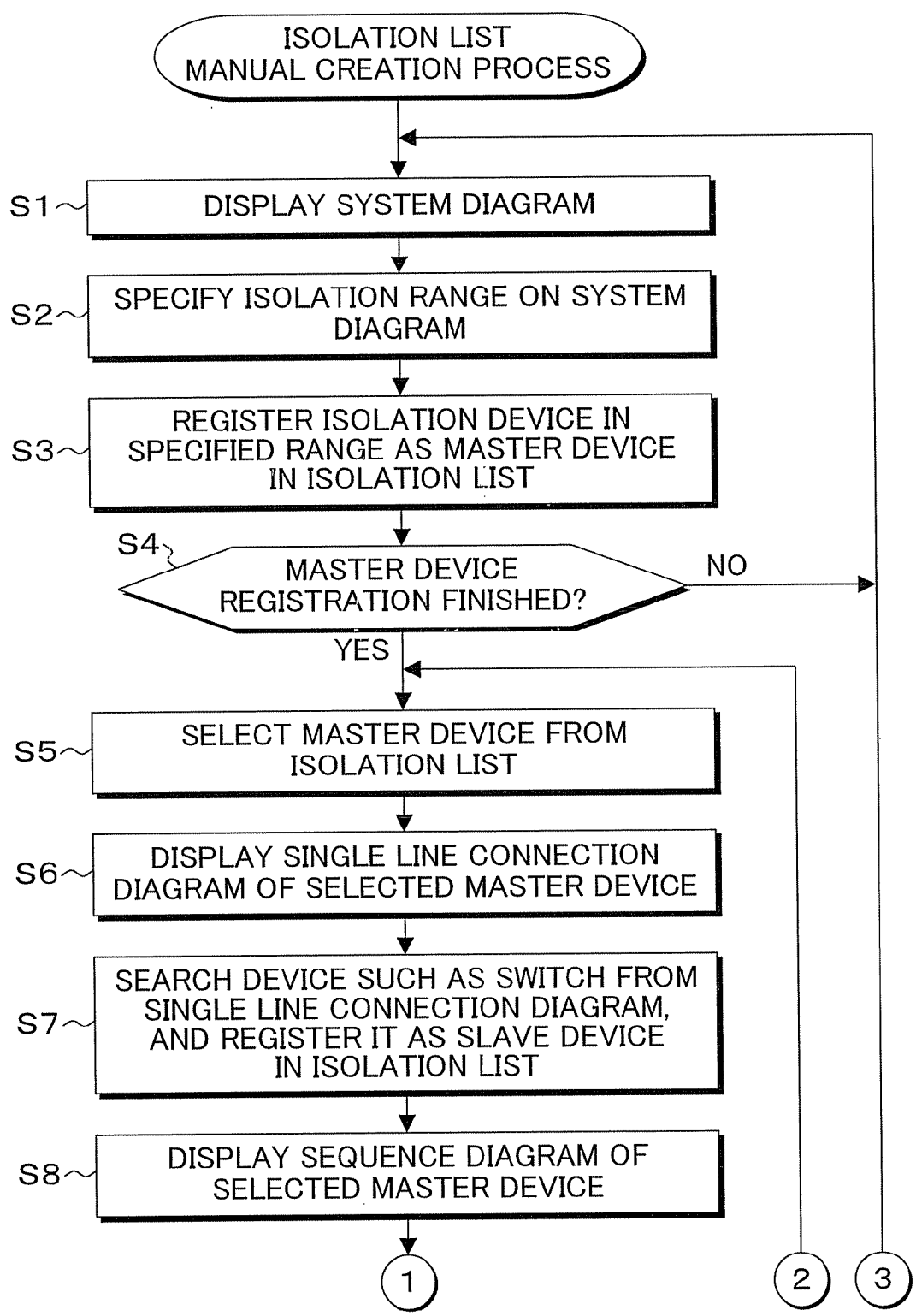
FIGS. 9A and 9B are flow charts of a creation process by the isolation list manual creation unit of FIGS. 1A and 1B.
Figure 9B:
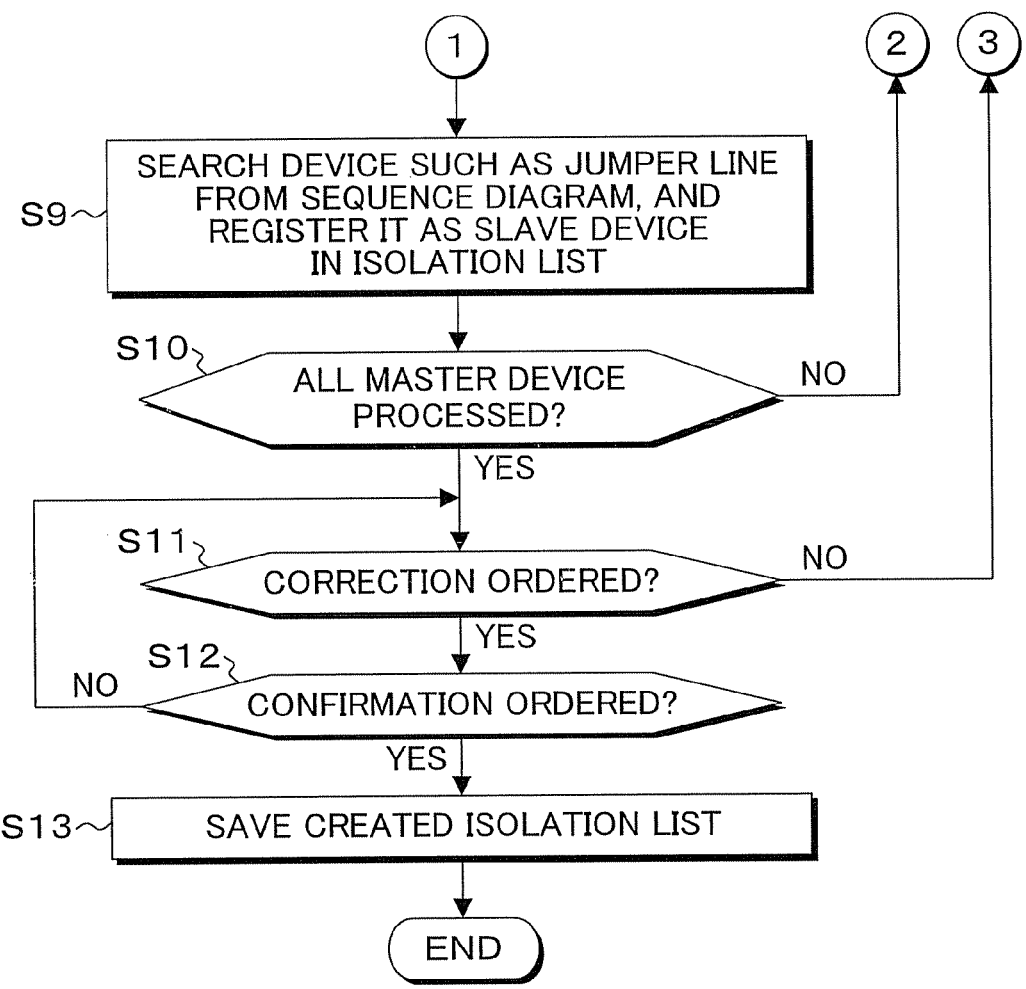

FIGS. 9A and 9B are flow charts of an isolation list manual creation process which supports creation of an isolation list by the manual operations by the isolation list manual creation unit 32 of FIGS. 1A and 1B.

In FIGS. 9A and 9B, in the isolation list manual creation process, in the state in which a part of a system diagram to be subjected to an isolation operation is displayed in step S1, an isolation range is specified in step S2, and the isolation devices of the specified range are registered as master devices in an isolation list, which is prepared as an isolation format and is during editing in step 3.

When registration of the master devices is finished in step S4, the process proceeds to step S5 in which a master device is selected from the isolation list, then, a single line connection diagram of the selected master device is displayed in step S6, and devices of switches and the like are selected from the single line connection diagram and registered as slave devices in the isolation list in step S7.

Subsequently, a sequence diagram of the selected master device is displayed in step S8, and devices such as jumper lines are searched from the sequence diagram and registered as slave devices in the isolation list in step S9. Whether all the master devices are processed or not is checked in step S10. If they are unprocessed, the process returns to step S5 and a next master device is selected; or, if all the master devices are processed, the process proceeds to step S11 in which presence of a correction order is checked.

If there is a correction order, the process returns to step S1, the system diagram is displayed, and the process by manual operations is repeated from the beginning. If there is no correction order, a confirmation order is awaited in step S12, and, if there is a confirmation order, the created isolation list is saved in the isolation list history file 26 in step S13.

In the isolation list manual operation process of FIGS. 9A and 9B, regarding display of system diagrams, single line connection diagrams, and sequence diagrams on a screen, they can be searched, for example, by device numbers by computer aid; however, all the registration by selecting master devices and slave devices necessary for the isolation list other than that is performed by manual input of the operator.

Figure 10A:
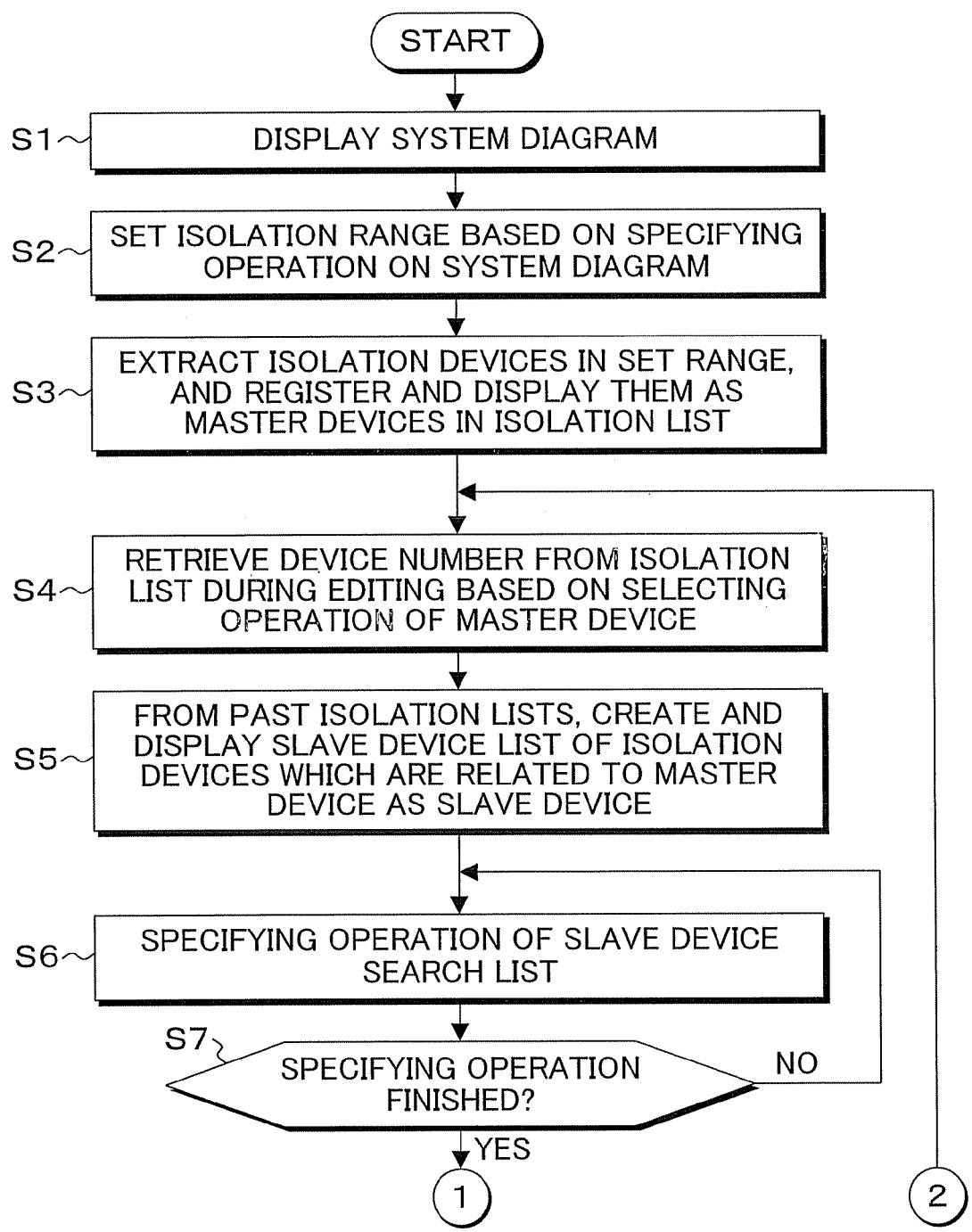
FIGS. 10A and 10B are flow charts of a creation process of the present invention by the isolation list creation unit of FIGS. 1A and 1B.
Figure 10B:
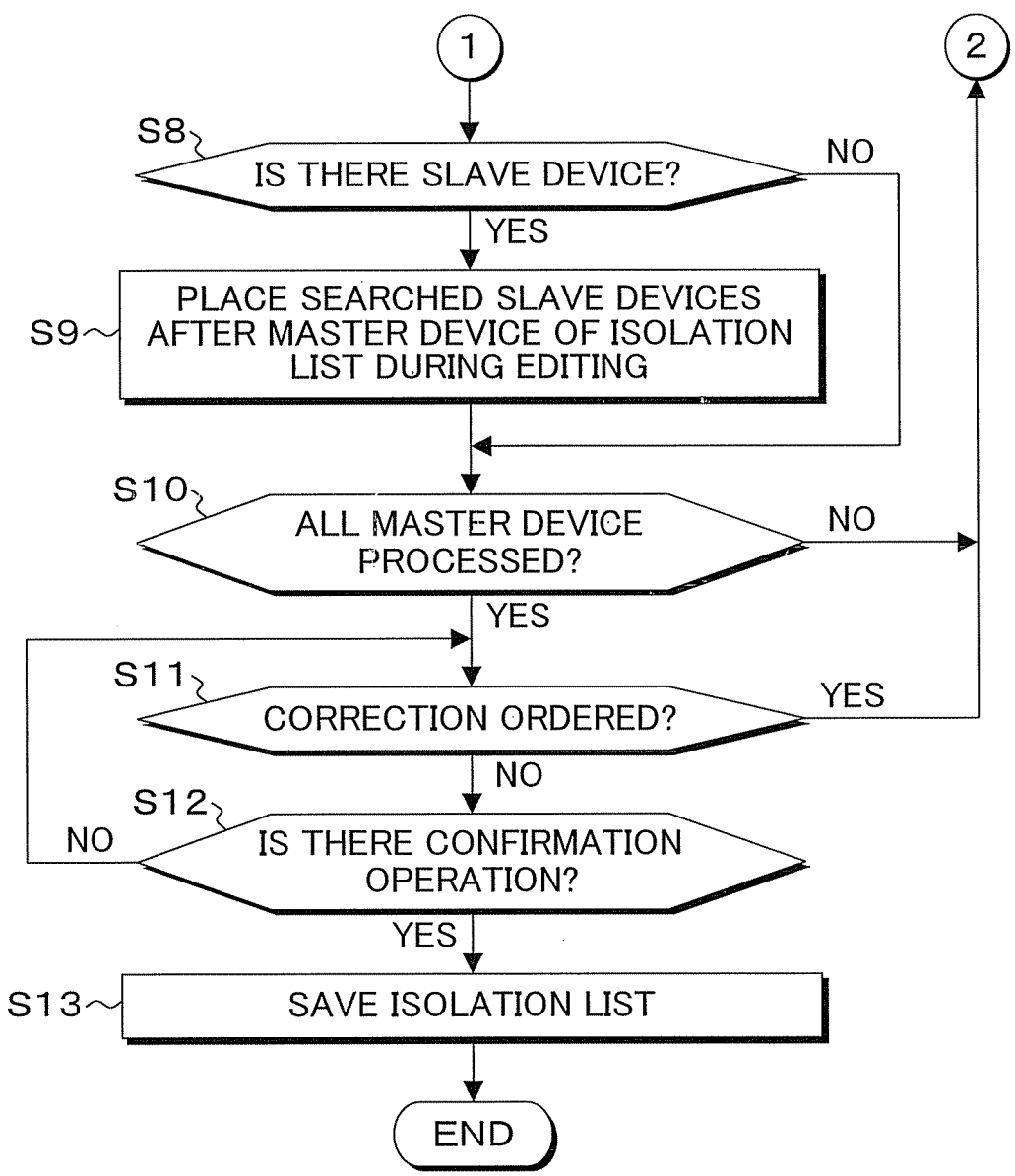

FIGS. 10A and 10B are flow charts of a creation process of the present invention by the isolation list creation unit 36 of FIGS. 1A and 1B. In FIGS. 10A and 10B, a system diagram including a device to be subjected to an isolation operation is displayed on the screen in step S1, and an isolation range is set in step S2 based on a specifying operation of surrounding it by a line, for example, by mouse dragging on the system diagram of the screen.

Subsequently, in step S3, isolation devices of the set range are extracted and registered and displayed as master devices in an isolation list which is created based on an isolation format and is during editing. The registration of the isolation devices as the master devices may be manual input of device numbers by the operator or may be drag and copy in which the device numbers of the system diagram are dragged and transferred to the isolation list by a copy process.

Next, a device number is retrieved from the isolation list, which is during editing, based on an operation of selecting a master device in step S4, and a slave device search list of the isolation devices which are related to the master device as slave devices is created from the past isolation lists stored in the isolation list history file 26 and displayed in step S5.

Subsequently, a specifying operation of the displayed slave device search list is performed in step S6; and, when finish of the specifying operation is determined in step S7, if there is a specified slave device(s) in step S8, the searched slave device(s) is placed after the master device of the isolation list, which is during editing, in step S9. If no slave device is specified, the process of step S9 is skipped.

Subsequently, whether all the master devices are processed or not is checked in step S10, and, if they are unprocessed, the process returns to step S4 in which the process of registering slave devices based on an operation of selecting a next master device is repeated. When all the master devices are processed in step S10, the process proceeds to step S11 in which presence of a correction order is checked; and, if there is a correction order, the process returns to step S4 in which a slave device search list is displayed based on an operation of selecting the master device which is required to be corrected, and correction such as changing the selected slave device(s) and placing new slave devices in the list is performed.

If there is no correction order in step S11, the process proceeds to step S12 in which the displayed completed isolation list is confirmed, and, if there is a confirmation operation, the process proceeds to step S13, the isolation list is transferred to and saved in the isolation list history file.

Next, a maintenance process of the past isolation files saved in the isolation history management file 26 by the maintenance processing unit 34 provided in the edition processing unit 30 of FIGS. 1A and 1B will be described.

It is presupposed that isolation lists 84-1 to 84-3 such as those of FIGS. 11A to 11C are presently saved as past isolation lists in the isolation list history file 26 of FIGS. 1A and 1B. Herein, the isolation list 84-1 is the oldest, and the isolation list 84-2 is the second oldest, and the isolation list 84-3 is the latest.

Among them, a slave device of the isolation list 84-1 of FIG. 11A is the device number "SEQ-020-10" which is a control board switch, a slave device of the isolation list 84-1 of FIG. 11B is the device number "SEQ-020-11" which is a control board switch, and slave devices of the latest isolation list 84-3 of FIG. 11C are the device numbers "SEQ-020-11" and "SEQ-020-12" of control board switches.

When the isolation lists 84-1 to 84-3 are compared with one another, the device number which has been "SEQ-020-10" in the old isolation list 84-1 as a slave device of the device number "AV-020-10" which is a master device is changed to the device number "SEQ-020-11" in the isolation list 84-2.

In such a case, the device number "SEQ-020-10" of the slave device in the old isolation list 84-1 is no longer in the slave relation with respect to the master device; therefore, maintenance in which the fact that the slave relation is deleted is set is required.

In such a case, with respect to the old isolation list 84-1 of FIG. 11A, maintenance is performed by opening a device state setting screen 90 such as that of FIG. 12 by the maintenance processing unit. In the device state setting screen 90, the device number "SEQ-020-10" of the slave device with respect to the device number "AV-020-10" which is the master device of the isolation list 84-1 of FIG. 11A is displayed in a list, and checkboxes are provided as relation deletion 92 in the left side of the device numbers.

Therefore, if the slave relation with the master device is desired to be deleted for the device number "SEQ-020-10", the checkbox of the relation deletion 92 thereof is checked. Then, when the device state setting screen 92 is closed after it is checked, a relation deletion flag of the isolation list 84-1 of FIG. 11A is set from previous 0 to 1.

When the relation deletion flag is set to 1 in the above described manner, the "slave device" of the master/slave relation in No. 2 corresponding to that is invalidated, and, although the contents of the isolation list 84-1 per se are not changed, the slave relation of the slave device with respect to the master device is deleted by the relation deletion flag.

Therefore, when a slave device search list 86-1 of FIG. 11D is created from FIGS. 11A to 11C, the device number "SEQ-020-10" which is the slave device is not displayed since the relation as the slave device has been deleted, and the device numbers "SEQ-020-11" and "SEQ-020-12" are displayed.

Figure 13:
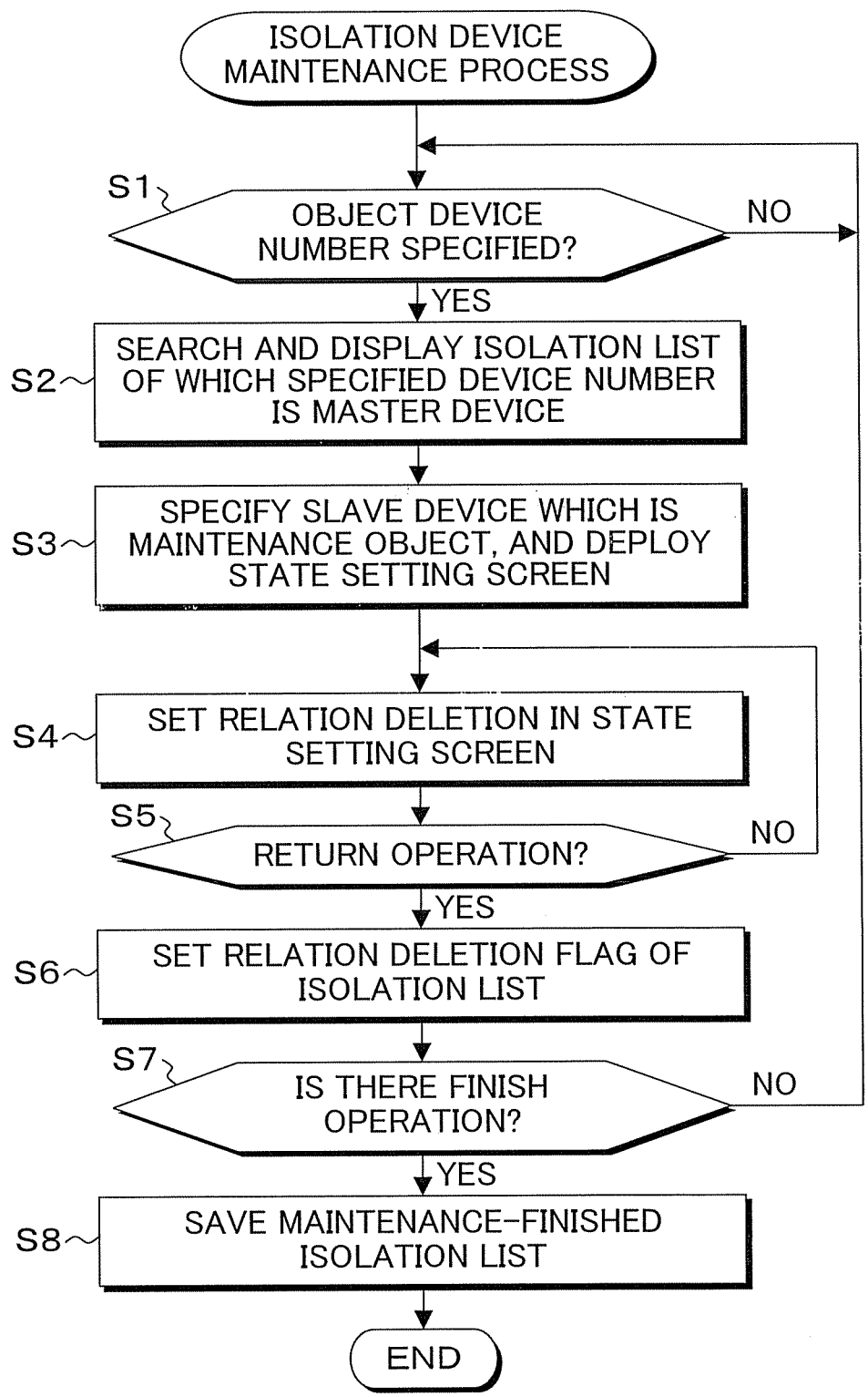
FIG. 13 is a flow chart of a maintenance process by the maintenance processing unit of FIGS. 1A and 1B.

FIG. 13 is a flow chart of an isolation device maintenance process by the maintenance processing unit 34 of the edition processing unit 30. In FIG. 13, when an object device number is specified in step S1, the process proceeds to step S2 in which an isolation list in which the specified device number is a master device is searched from the isolation list history file and displayed, and, subsequently, a state setting screen including the slave device to be subjected to maintenance is deployed in step S3.

In the state setting screen, setting of relation information deletion is performed by a check box or the like for the required slave device in step S4, and, when a return operation of the screen is determined in step S5, the process proceeds to step S6 in which the relation of the slave relation with respect to the master device of the slave device is cancelled by setting a relation deletion flag of the isolation list. Then, when a finish operation is determined in step S7, the isolation list which has undergone the maintenance is saved in the isolation list history file in step S8.

Through such isolation device maintenance process, even if it is an isolation list created in the past, when the slave device is no longer treated for the master device, the slave device for which the relation deletion flag is set is no longer unnecessarily listed in the slave device search list through referencing the isolation list history file according to the master device, and the operator can make a selection in the list from the slave devices effectively having the slave relation as slave devices.

Moreover, since the slave relation is deleted by setting of the relation deletion flag without breaking the list contents of the isolation list created in the past, the resource contents of the created past isolation list are not broken, and the function as history saving is not impaired.

Figure 14B:
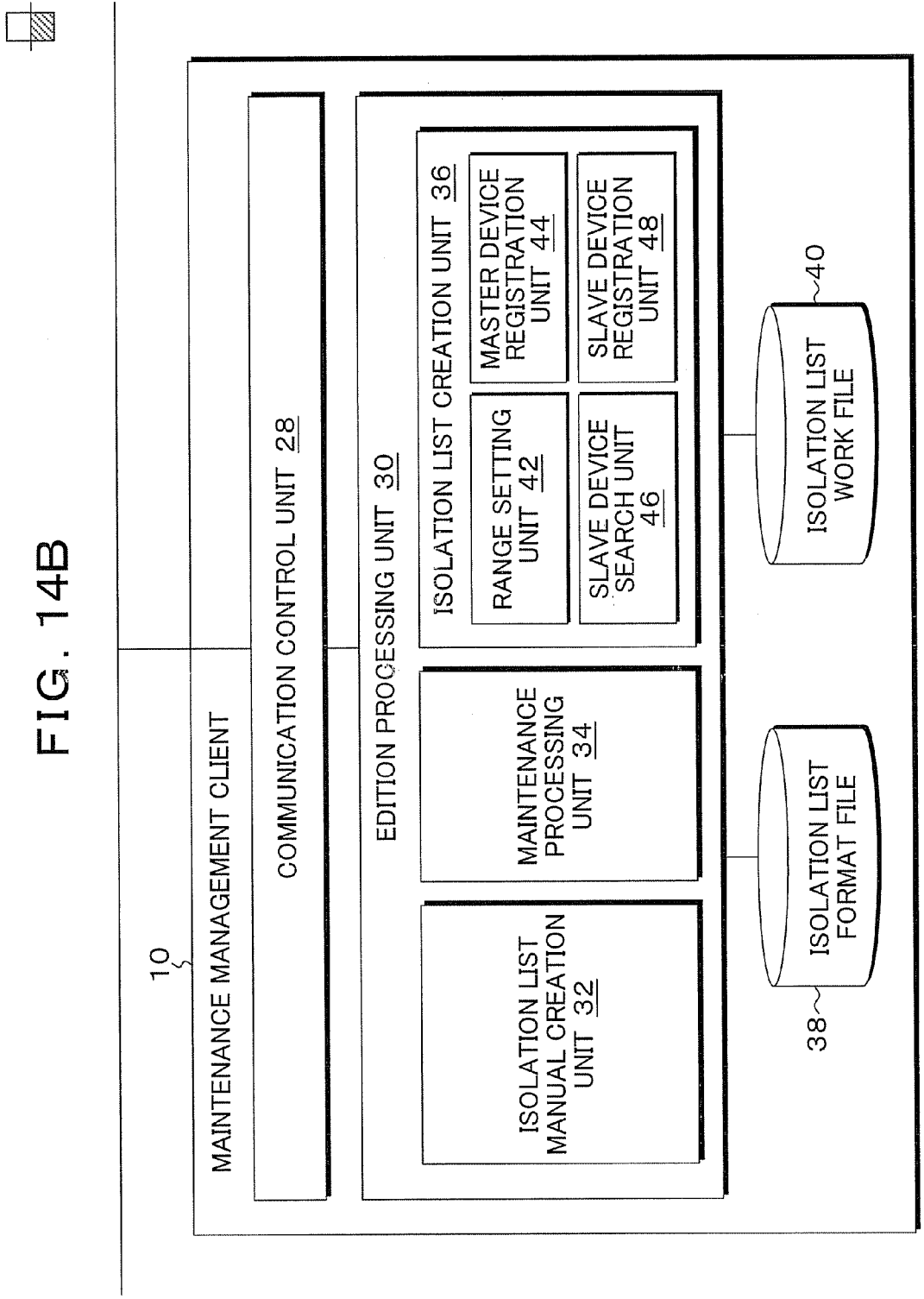

FIGS. 14A and 14B are block diagrams showing another embodiment of the present invention using CAD drawings as system diagrams when isolation lists are to be created.

In FIGS. 14A and 14B, although the maintenance management client 10 and the maintenance management database server 14 are same as the embodiment of FIGS. 1A and 1B, a CAD drawing file 94 is newly stored in the drawing management server 12 in addition to the device number file 18. In the CAD drawing file 94, all devices are categorized in the format of "device model-system-device"; therefore, automatic setting of an isolation range using CAD drawings and specifying the device numbers of the isolation devices included in the isolation range enable automatic creation of a slave device search list by referencing the isolation list history file.

Figure 15:
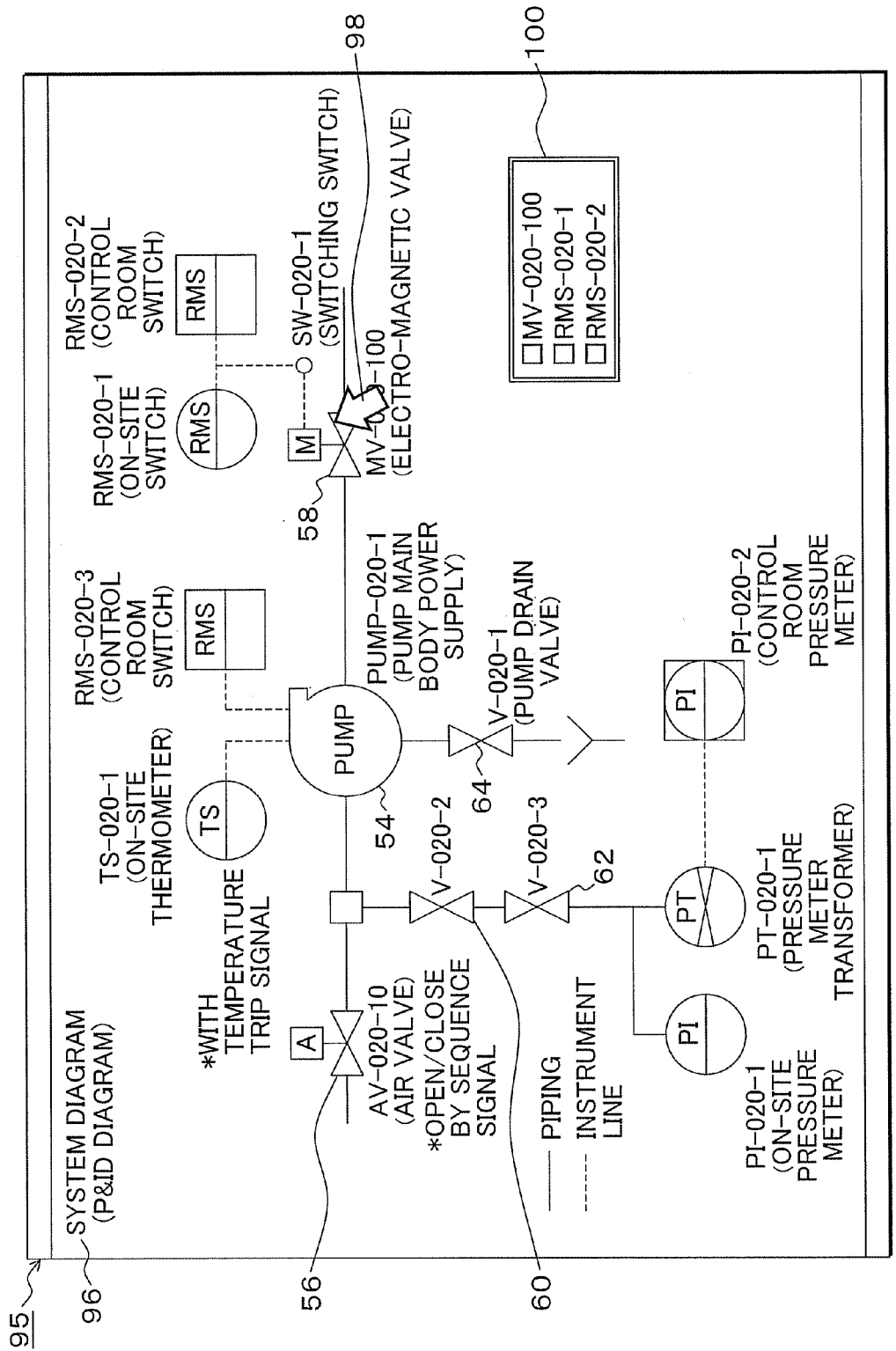
FIG. 15 is a screen explanatory diagram showing automatic setting of an isolation range and a slave device search list for the CAD drawing.

FIG. 15 is a screen explanatory diagram in which a system diagram is displayed as a CAD drawing in an isolation creation process by the maintenance management client 10 of FIGS. 14A and 14B to show automatic setting of an isolation range and creation display of a slave device search list.

In FIG. 15, a system diagram 96 of a part that is to be subjected to an isolation operation is shown in a CAD display screen 95. When the pump 54 to be subjected to a dismantling operation is clicked in this state, since relation is provided in advance as CAD information between the device and the system, around the pump 54, in addition to the air valve 56, the electro-magnetic valve 58, the manual valves 60 and 62, and the pump drain valve 64 which serve as isolation objects, switches and the like and jumpers and the like which are in link relation are automatically selected from single line connection diagrams and sequence diagrams related to the isolation devices, and an isolation range is displayed, for example, by a bold line on the system diagram.

Also, along with automatic setting of the isolation range of the system diagram 96, the device numbers and names of the isolation devices are acquired from the CAD information, and, by using that, the editing screen 82 serving as the framework having registration contents of master devices such as that shown in FIGS. 6A and 6B is automatically generated.

Subsequently, in the CAD display drawing 95 in which the isolation range is boldly displayed, for example, if the electromagnetic valve 58 is specified by a mouse cursor 98 as an isolation device, based on the device number embedded in the electro-magnetic valve 58 as CAD information, the slave device search unit 46 in the isolation list creation unit 36 of FIG. 13 accesses the maintenance management database server 14, searches past isolation lists from the isolation list history file 26, and displays a slave device search window 100 as shown in the lower side.

When checkboxes required to be selected are clicked with respect to the device numbers of the slave devices displayed in the slave device search window 100, the slave devices to be inserted after the master device in the isolation list, in which setting/registration of the devices serving as slave devices which are in link relation in which the electro-magnetic valve 58 is the master device, are registered.

As described above, in creation of the isolation list utilizing the CAD drawing of FIGS. 14A and 14B, selection/specification of the master devices and slave devices serving as isolation devices can be efficiently performed on the system diagram as the CAD drawing of the editing screen by utilizing the resources of the past isolation file, and creation of an isolation list according to the present invention can be efficiently performed similarly by utilizing the information of the CAD drawing in which they are categorized in the format of "device type-system-device".

Figure 16A:
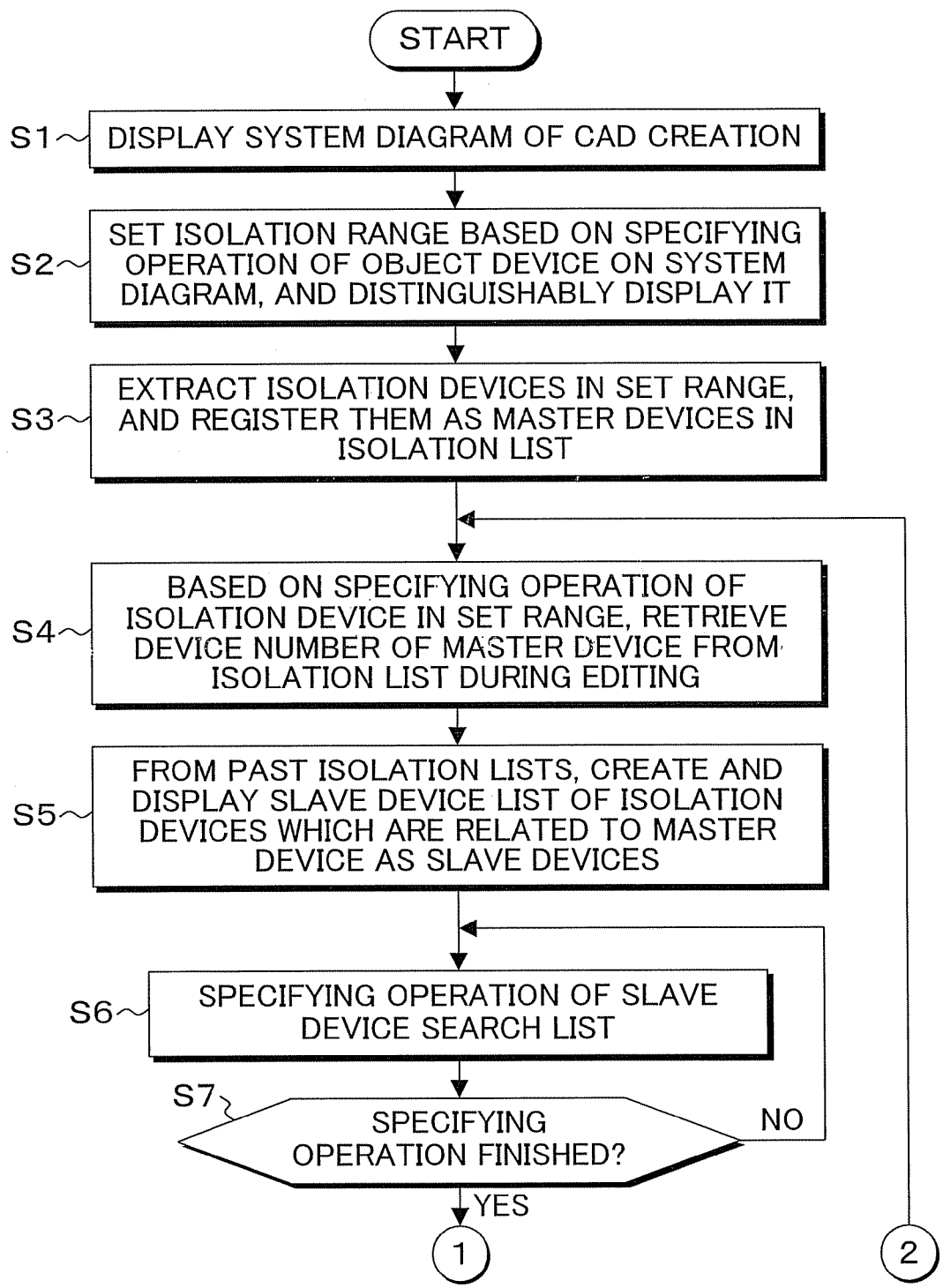
FIGS. 16A and 16B are flow charts of a creation process of the present invention by the isolation list creation unit of FIGS. 14A and 14B.
Figure 16B:
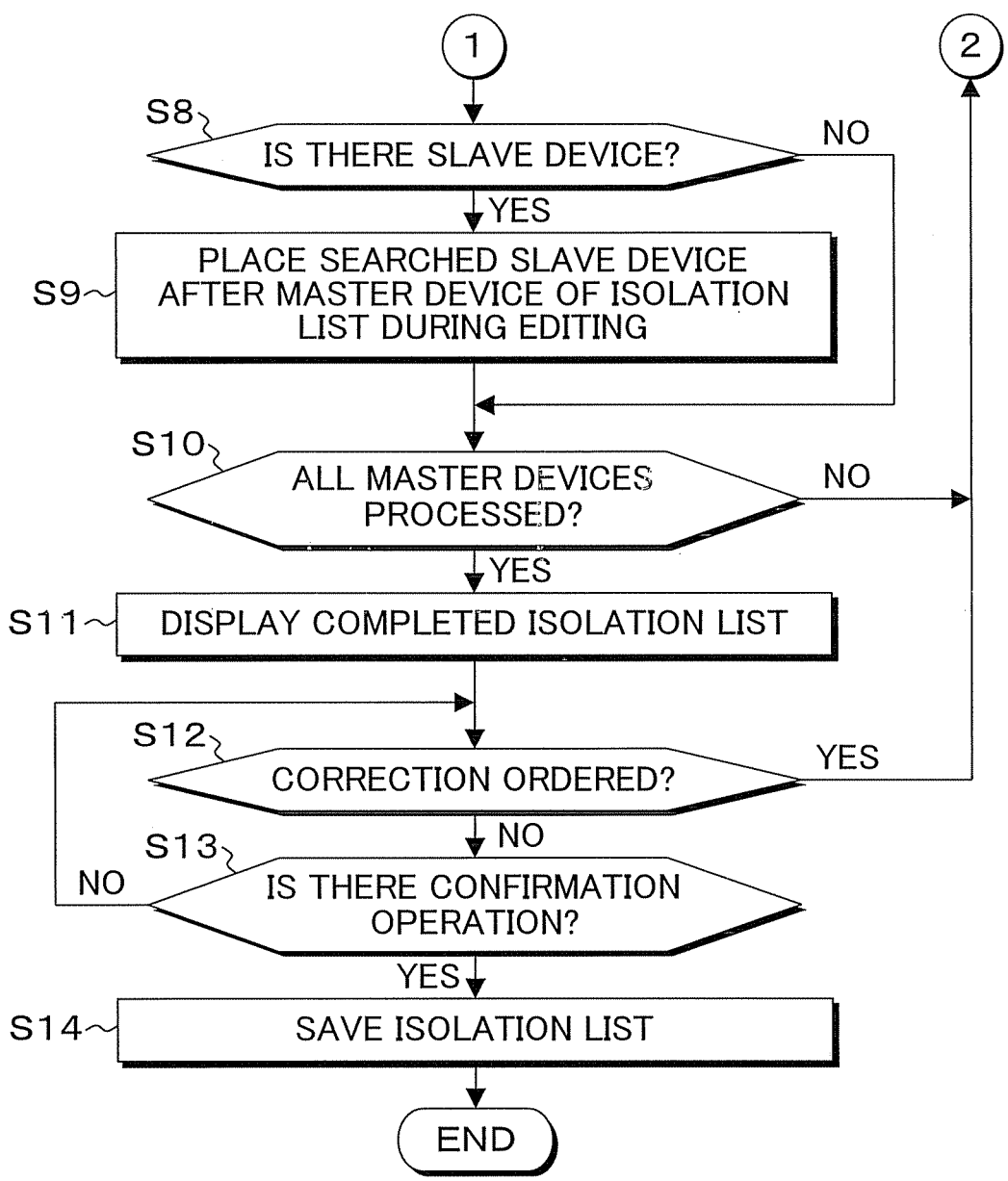
Figure 17:
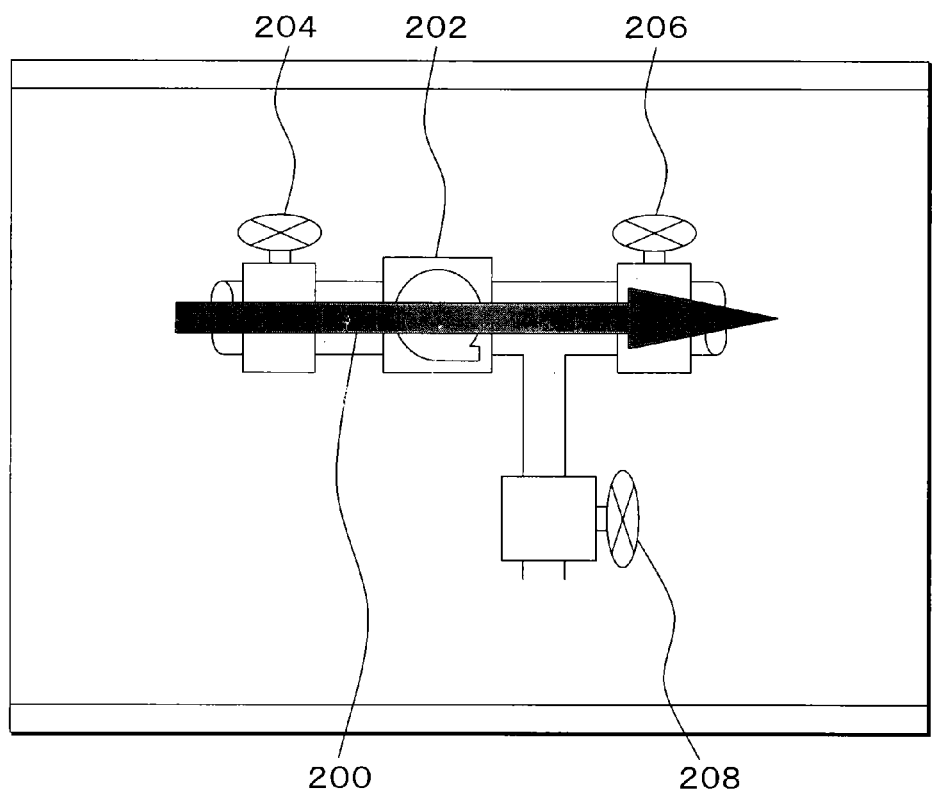
FIG. 17 is an explanatory diagram of a system diagram display screen of equipment to be subjected to an isolation operation.

FIGS. 16A and 16B are flow charts of a creation process of the present invention by the isolation list creation unit of FIGS. 14A and 14B. In FIGS. 16A and 16B, in the state in which a CAD-created system diagram is displayed in step S1, based on a specifying operation of, for example, a pump which is to be dismantled as an object device on the system diagram, an isolation range is automatically set and distinguishably displayed in step S2.

Next, in step 3, the isolation devices in the automatically set range are registered as master devices in an isolation list by automatic extraction.

Subsequently, in step S4, based on a specifying operation of an isolation device in the set range, the device number of a master device is retrieved from the isolation list, which is during editing; and, in step S5, a slave device search list of the isolation devices which are in the relation of slave devices with respect to the master device is created from the past isolation lists saved in the isolation list history file 26 and displayed.

Then, in step S6, a specifying operation of the created and displayed slave device search list is performed; and, when specifying operation finish is determined in step S7, and if a slave device is specified in step S8, the searched slave device is inserted and placed after the master device of the isolation list, which is during editing, in step S9.

Subsequently, whether all the master devices are processed or not is checked in step S10. If they are unprocessed, the process returns to step S4, or, if they are processed, the process proceeds to step S11 in which the completed isolation list is displayed.

Then, presence of a correction order is checked in step S12. If there is a correction order, the process returns to step S4 to perform correction again; or, if there is no correction order, a confirmation operation is awaited in step S13, and the completed isolation list is saved in the isolation list history file and the series of process is finished in step S14.

The present invention also provides programs for the isolation list creation executed by the computers which constitute the maintenance management clients 10 of FIGS. 1A and 1B and FIG. 13, and the programs have the processing procedures according to the flow chart of FIGS. 10A and 10B or the flow chart of FIGS. 16A and 16B.

Note that the present invention includes arbitrary modifications that do not impair the object and advantages thereof and is not limited by the numerical values shown in the above described embodiments.

The invention claimed is:

1. A non-transitory computer-readable storage medium which stores a program causing a computer to perform a process comprising:
creating an isolation list, to which information of master/slave relation of isolation devices is added, by a manual operation upon an isolation operation for isolating particular devices in repair check or periodical check with respect to failure of plant devices in an initial stage, and saving the isolation list in a history file;
displaying a system diagram of equipment on a screen;
setting an isolation range based on a specifying operation with respect to the system diagram of equipment displayed on the screen;
extracting the isolation device present in the set range and registering the device as a master device in an isolation list;
displaying the isolation list on the screen;
sequentially selecting the master device from the isolation list displayed on the screen, searching the isolation device which is in the relation of slave device with respect to the selected master device from the history file, and displaying a slave device list; and
inserting and placing the slave device selected based on a selecting operation of the slave device list after the corresponding master device of the isolation list so as to complete the list;
wherein,
the isolation lists which are created in the past are utilized as virtual master data by accumulating a history of the isolation list;
in saving the isolation list, executing maintenance processes of the list contents so as to maintain latest isolation list contents, when the contents of isolation lists created in the past and saved in the isolation list history file are to be changed upon list creation along with isolation operations thereafter;
the isolation list includes, as display articles, device numbers, device category information indicating whether the device is the master device or the slave device, and related device information indicating master/slave relation;
the isolation list further has relation deletion information which cancels setting of the slave device as a display article, and effectively sets the relation deletion information in accordance with needs by a maintenance process so as to cancel master/slave relation without changing the list contents.

2. The non-transitory computer-readable storage medium according to claim 1, characterized in that the slave devices of the isolation list include switches and the like extracted from a single line connection diagram of a power supply system and the like related to the master device and jumpers and the like extracted from a sequence diagram.

3. The non-transitory computer-readable storage medium according to claim 1, characterized in that
a CAD drawing is displayed as the system diagram, and the isolation range is automatically set based on a specifying operation of a maintenance object device in the CAD drawing; and,
with respect to a specifying operation of the master device on the CAD drawing, the isolation device which is related to the specified master device as the slave device is searched from the history file, and a slave device list is displayed in a window.

4. An isolation list creation method by casing a computer aid comprising:
creating an isolation list, to which information of master/slave relation of isolation devices is added, by a manual operation upon an isolation operation for isolating particular devices in repair check or periodical check with respect to failure of plant devices in an initial stage, and saving the isolation list in a history file;
displaying a system diagram of equipment on a screen;
setting an isolation range based on a specifying operation with respect to the system diagram of equipment displayed on the screen;
extracting the isolation device present in the set range and registering the device as a master device in an isolation list;
displaying the isolation list on the screen;
sequentially selecting the master device from the isolation list displayed on the screen, searching the isolation device which is in the relation of slave device with respect to the selected master device from the history file, and displaying a slave device list; and
inserting and placing the slave device selected based on a selecting operation of the slave device list after the corresponding master device of the isolation list so as to complete the list;
wherein,
the isolation lists which are created in the past are utilized as virtual master data by accumulating a history of the isolation list;
in saving the isolation list, executing maintenance processes of the list contents so as to maintain latest isolation list contents, when the contents of isolation lists created in the past and saved in the isolation list history file are to be changed upon list creation along with isolation operations thereafter;
the isolation list includes, as display articles, device numbers, device category information indicating whether the device is the master device or the slave device, and related device information indicating master/slave relation;
the isolation list further has relation deletion information which cancels setting of the slave device as a display article, and effectively sets the relation deletion information in accordance with needs by a maintenance process so as to cancel master/slave relation without changing the list contents.

5. The isolation list creation method according to claim 4, characterized in that the slave devices of the isolation list include devices such as switches and the like extracted from a single line connection diagram of a power supply system and the like related to the master device and jumpers and the like extracted from a sequence diagram.

6. The isolation list creation method according to claim 4, characterized in that
a CAD drawing is displayed as the system diagram, and the isolation range is automatically set based on a specifying operation of a maintenance object device in the CAD drawing; and,
with respect to a specifying operation of the master device on the CAD drawing, the isolation device which is in the relation of slave device with respect to the selected master device is searched from the history file, and a slave device list is displayed in a window.

7. An isolation list creation device by means of computer aid comprising:
a history saving unit which creates an isolation list, to which information of master/slave relation of isolation devices is added, by a manual operation upon an isolation operation for isolating particular devices in repair check or periodical check with respect to failure of plant devices in an initial stage, and saves the isolation list in a history file;
a displaying unit which displays a system diagram of equipment on a screen;
a range setting unit which sets an isolation range based on a specifying operation with respect to the system diagram of equipment displayed on the screen;
a master device registration unit which extracts the isolation device present in the set range and registers the device as a master device in an isolation list;
a displaying unit which displays the isolation list on the screen;
a slave device search unit which sequentially selects the master device from the isolation list displayed on the screen, searches the isolation device which is in the relation of slave device with respect to the selected master device from the history file, and displays a slave device list; and
a slave device registration unit which inserts and places the slave device selected based on a selecting operation of the slave device list after the corresponding master device of the isolation list so as to complete the list;
wherein,
the isolation lists which are created in the past are utilized as virtual master data by accumulating a history of the isolation list;
the history saving unit, executes maintenance processes of the list contents so as to maintain latest isolation list contents, when the contents of isolation lists created in the past and saved in the isolation list history file are to be changed upon list creation along with isolation operations thereafter;
the isolation list includes, as display articles, device numbers, device category information indicating whether the device is the master device or the slave device, and related device information indicating master/slave relation;
the isolation list further has relation deletion information which cancels setting of the slave device as a display article, and effectively sets the relation deletion information in accordance with needs by a maintenance processing unit so as to cancel master/slave relation without changing the list contents.

8. The isolation list creation device according to claim 7, characterized in that the slave devices of the isolation list include devices such as switches and the like extracted from a single line connection diagram of a power supply system and the like related to the master device and jumpers and the like extracted from a sequence diagram.

9. The isolation list creation device according to claim 7, characterized in that
the range setting unit displays a CAD drawing as the system diagram, and automatically sets the isolation range based on a specifying operation of a maintenance object device in the CAD drawing; and,
with respect to a specifying operation of the master device on the CAD drawing, the slave device search unit searches the isolation device which is related to the specified master device as the slave device from the history file, and displays a slave device list in a window.

* * * * *